(12) United States Patent
Ulrich et al.

(10) Patent No.: US 12,111,065 B2
(45) Date of Patent: Oct. 8, 2024

(54) INTELLIGENT MEASURING APPARATUS

(71) Applicant: REFCO Manufacturing Ltd., Hitzkirch (CH)

(72) Inventors: Manfred Ulrich, Hitzkirch (CH); Ulrich Demuth, Erbach (DE); Michael Oswald, Lucerne (CH)

(73) Assignee: Refco Manufacturing Ltd., Hitzkirch (CH)

( * ) Notice: Subject to any disclaimer, the term of this patent is extended or adjusted under 35 U.S.C. 154(b) by 814 days.

(21) Appl. No.: 17/231,654

(22) Filed: Apr. 15, 2021

(65) Prior Publication Data

US 2021/0231335 A1 Jul. 29, 2021

Related U.S. Application Data

(63) Continuation of application No. PCT/EP2019/077983, filed on Oct. 15, 2019.

(30) Foreign Application Priority Data

Oct. 15, 2018 (DE) ...................... 10 2018 008 125.8

(51) Int. Cl.
*F24F 11/49* (2018.01)
*G01L 19/12* (2006.01)
(Continued)

(52) U.S. Cl.
CPC .............. *F24F 11/49* (2018.01); *G01L 19/12* (2013.01); *F24F 2110/40* (2018.01); *F25B 45/00* (2013.01); *F25B 2345/007* (2013.01)

(58) Field of Classification Search
CPC ........ F24F 11/49; F24F 2110/40; F24F 11/30; G01L 19/12; F25B 45/00; F25B 2345/007;
(Continued)

(56) References Cited

U.S. PATENT DOCUMENTS

| 4,853,927 A | 8/1989 | Wenzel |
| 5,587,996 A | 12/1996 | Mitzuno |

(Continued)

FOREIGN PATENT DOCUMENTS

| CN | 101124436 A | 2/2008 |
| CN | 102450033 A | 5/2012 |

(Continued)

*Primary Examiner* — Eric Blount
(74) *Attorney, Agent, or Firm* — Muncy, Geissler, Olds & Lowe, P.C.

(57) ABSTRACT

A measuring apparatus having a housing, at least one internal sensor, an electronic control unit, at least one radio module, an operating device and an information carrier. The measuring apparatus is configured to be connected to external sensors by cable and/or wirelessly, the electronic control unit is configured to convert measurement signals from internal and external sensors into digital measurement data and to provide the digital measurement data to the information carrier. The information carrier is configured to provide and display as priority, in the case of simultaneous availability of wired or wireless sensors, either the data of the wired sensors or the data of the wireless sensors. A system for performing measurement tasks and managing measurement data, and methods for starting up and/or maintaining an air conditioning system are also provided, as well as methods for starting up and/or maintaining a system.

20 Claims, 14 Drawing Sheets

(51) Int. Cl.
*F24F 110/40* (2018.01)
*F25B 45/00* (2006.01)

(58) Field of Classification Search
CPC ........... H04W 4/90; H04W 4/38; H04W 4/80; H04L 67/12; G01D 21/00
USPC ........................................................ 340/626
See application file for complete search history.

(56) References Cited

U.S. PATENT DOCUMENTS

| | | | |
|---|---|---|---|
| 8,285,518 | B2 | 10/2012 | Babel et al. |
| 8,322,151 | B1* | 12/2012 | Garofalo .................. F24F 11/62 62/149 |
| 9,660,325 | B2 | 5/2017 | Haase et al. |
| 10,452,061 | B2* | 10/2019 | Yenni ........................ F24F 11/49 |
| 2006/0041335 | A9* | 2/2006 | Rossi .................. G05B 23/0235 700/276 |
| 2008/0051945 | A1 | 2/2008 | Kates |
| 2012/0105249 | A1 | 5/2012 | Bauerfeld et al. |
| 2012/0143394 | A1 | 6/2012 | Tollkuehn et al. |
| 2014/0025321 | A1 | 1/2014 | Spanler |
| 2014/0262130 | A1* | 9/2014 | Yenni ........................ F24F 11/89 165/11.1 |
| 2015/0241316 | A1 | 8/2015 | Ulrich et al. |
| 2017/0163608 | A1 | 6/2017 | Bicket et al. |

FOREIGN PATENT DOCUMENTS

| | | |
|---|---|---|
| CN | 202421061 U | 9/2012 |
| CN | 102697498 A | 10/2012 |
| CN | 203174204 U | 9/2013 |
| CN | 104258638 A | 1/2015 |
| CN | 104685306 A | 6/2015 |
| CN | 205211145 U | 5/2016 |
| CN | 206439619 U | 8/2017 |
| CN | 107677432 A | 2/2018 |
| DE | 195 38 227 A1 | 8/1996 |
| DE | 20 2012 010 642 U1 | 2/2013 |
| DE | 10 2013 113 258 A1 | 6/2015 |
| EP | 0 271 169 A2 | 6/1988 |
| JP | 2004-096906 A | 3/2004 |
| WO | WO 2007/125020 A1 | 11/2007 |
| WO | WO 2010/028788 A1 | 3/2010 |
| WO | WO 2017/022905 A1 | 2/2017 |

* cited by examiner

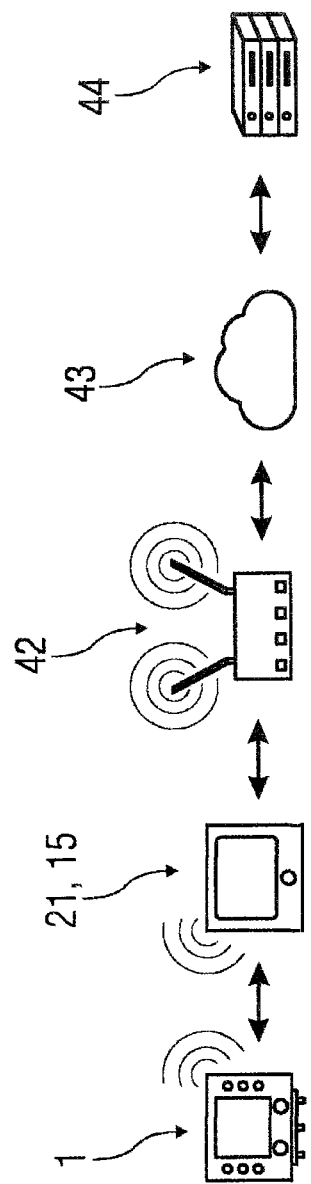
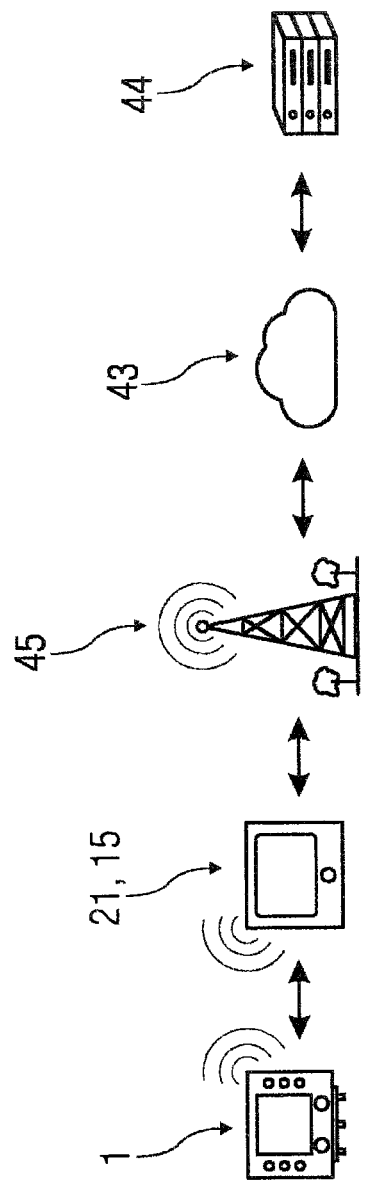

INTELLIGENT MEASURING APPARATUS

This nonprovisional application is a continuation of International Application No. PCT/EP2019/077983, which was filed on Oct. 15, 2019 and which claims priority to German Patent Application No. 10 2018 008 125.8, which was filed in Germany on Oct. 15, 2018 and which are both herein incorporated by reference.

BACKGROUND OF THE INVENTION

Field of the Invention

The present invention relates to a measuring apparatus, a system for performing measurement tasks and for managing measurement data and a method for starting up and/or maintaining an air conditioning system.

Description of the Background Art

Chemical industrial installations are provided with a plurality of measuring points which must be calibrated at regular intervals. For this purpose, it is necessary for comparative measurements to be performed parallel to the measuring points and to this end, for example, sensors to be placed in prepared reference openings or on/in service ports, and for measurements to be performed by means of the sensors. In order to track a regular course of measurement over a period of time, it is expedient to record the measurement data, centrally store it and make it available locally. Likewise, a wireless connection to a measuring point or a central data storage facilitates handling.

Optimized service with measuring apparatuses is particularly useful for air conditioning systems. Air conditioners consist in essence of a circuit with two heat exchangers, a controlled relief valve and a pump, wherein the circuit is filled with a refrigerant. The gaseous refrigerant is compressed by the pump and condenses while releasing heat in a heat exchanger in a HP (high-pressure) portion of the air conditioner. The refrigerant expands at the valve and during evaporation absorbs heat enthalpy in a heat exchanger in the LP (low-pressure) portion of the air conditioner, thus cooling a medium there. The evaporated refrigerant in the low-pressure portion of the air conditioning system is again supplied to the pump.

To fill or refill an air conditioning system with refrigerant, it is routinely drawn off using a vacuum pump and thereby also dehumidified. After that, the air conditioner is filled, wherein a pressure in the high-pressure portion and downstream of the expansion valve in the low-pressure portion is set to certain values depending on the vapor pressure temperature of the refrigerant used. Here, the efficiency of the air conditioning depends, among other things, on these set values. The enthalpies can be determined from pressure and temperature measurement data in the HP and LP sections of an air conditioning system. For this purpose, refrigerant-specific auxiliary tables are used. From the enthalpies and the electrical power consumption of the air conditioning system, an efficiency according to the definition of an industry-standard efficiency, such as EER (Energy Efficiency Ratio) or COP (Coefficient of Performance), can be calculated.

From the prior art, generally purely mechanical maintenance apparatuses are known, which are used to support technicians in the startup or maintenance of air conditioning systems.

DE202012010642 U1, which corresponds to US 2015/0241316, which is incorporated herein by reference, discloses a digital maintenance apparatus with a housing, with a valve block having a high-pressure port (HP port) and a corresponding valve, a low-pressure port (LP port) and a corresponding valve and a service connection, a low-pressure side temperature probe connection, a high-pressure side temperature probe connection and an electronic evaluation, which is provided with a power storage and is fed by it. The evaluation is connected to keys, which are connected to internal pressure sensors that are connected to the valve block in a pressure-tight manner. Furthermore, the evaluation is connected with two terminals for external temperature sensors, and has a data memory and a display controller, which is connected to a digital display.

In this case, the technician can use wired temperature sensors for the measurement of the pressure in the high-pressure portion and the low-pressure portion of the air conditioning system.

SUMMARY OF THE INVENTION

It is therefore an object of the present invention to provide a measuring apparatus that is improved over the prior art and an improved system for performing measurement tasks and for managing measurement data.

Furthermore, it is the object of the invention to specify methods for starting up and/or maintaining air conditioning systems.

The exemplary measuring apparatus, hereinafter also referred to as the maintenance apparatus, comprises a housing, at least one internal sensor, an electronic control unit, at least one radio module, an operating device and an information carrier. The measuring apparatus is designed to be connected by cable and/or wirelessly to external sensors. The electronic control unit is designed to convert measurement signals of internal and external sensors into digital measurement data and to provide the digital measurement data to the information carrier.

According to the invention, in the event of sensors connected by cable or wirelessly connected sensors being simultaneously available, the information carrier is configured to provide as a priority and to display either the data from the sensors connected by cable or the data from the wirelessly connected sensors.

By means of the measuring or maintenance apparatus, intelligent support for a technician during startup or maintenance of an air conditioning system can be implemented in an advantageous manner in that data are provided for the information carrier and/or are transferred to the latter. The information carrier can display, further process and/or analyze this data. Thus, a measuring apparatus is provided with which the startup and maintenance of industrial installations in the chemical industry, but in particular also air conditioning systems, air conditioning/refrigeration systems and heat pumps (hereinafter collectively referred to as air conditioning), is facilitated.

In this case, the measuring apparatus is inexpensive and the intelligent support provides a user with improved and easier operation and coupling of sensors that are connected by cable and/or wirelessly.

In a possible embodiment of the measuring apparatus, the wireless module is adapted to communicate with other equipment using one or more wireless technologies and/or logs, for example the so-called Bluetooth standard, according to the standard of the IEEE-802.11 family, for example wireless LAN, or according to a cellular standard.

In a further possible embodiment of the measuring apparatus, the information carrier is directly connected to wireless temperature or pressure sensors which transmit measurement data to it, or indirectly connected to wireless and/or wired temperature or pressure sensors via the electronic control unit. In the last-mentioned case, the wired and/or wireless sensors transmit measurement data to the electronic control unit. The control unit can process and analyze this data and/or transmit it to the information carrier in processed or unprocessed form.

Depending on the configuration or the type of sensor, the information carrier is set up to automatically provide as priority and to display, with simultaneous connection to wired and wireless sensors, either the data of the wired or the data of the wireless sensors.

The configuration in this context is the configuration and parameterization of the measurement or maintenance apparatus, which at least, but not exclusively, can affect the following settings: Selection of a refrigerant; Selection of a display function of the maintenance apparatus; and/or Selection of a preferred type of sensor, i.e. wireless sensors or wired sensors.

In this context, sensor type can mean, for example, both the sensor type in the sense of the measuring principle (relative pressure, absolute pressure, vacuum pressure sensor, resistance thermometer, thermocouple), the sensor type in relation to the connection to the measuring or maintenance apparatus (wired, wireless via a specific wireless log) as well as the sensor type in terms of an assigned display function (HP—High Pressure, or LP—Low Pressure), or a combination of these categories For the information carrier to provide the data as priority or display the data, in particular measurement data, of one sensor versus the data of another sensor, in this context means, for example, that the data from the sensor treated with priority is processed, analyzed and/or displayed on a screen by the information carrier, while the data of the other sensor is not processed, analyzed and/or displayed on a screen or at least not processed, analyzed and/or displayed on a screen at the same time.

In a further possible embodiment of the measuring apparatus, the information carrier uses as priority or displays measurement data from an externally connected wired or wireless sensor as compared to measurement data from the internal sensor.

In a further possible embodiment of the measuring apparatus, this comprises a valve block. The valve block comprises a high-pressure connection and an associated check valve for connection to a high-pressure portion of an air conditioner, a low-pressure port and an associated check valve for connection to a low-pressure portion of the air conditioner and at least one service connection, in particular designed for connection to a compressed gas cylinder or a pump. The high-pressure connection and the low-pressure connection are each in pressure-tight, fluidic connection with an internal pressure sensor.

In a further possible embodiment of the measuring apparatus, this includes pressure generating device and/or a pressure control device.

In a further possible embodiment of the measuring apparatus, the information carrier is a human-machine interface which is integrated in measuring instruments.

In a further possible embodiment of the measuring apparatus, the information carrier is realized by a screen unit which is fixedly connected with the measuring apparatus and with the electrical control unit. This screen unit can be, for example, an LCD display, an LED or OLED display, or a holographic screen. The screen unit can be controlled by an optional screen driver unit.

In a further possible embodiment of the measuring apparatus, the screen unit permanently connected to the measuring apparatus and to the electronic control unit is combined with the operating device in the form of a touch display. Options for this purpose are resistive, capacitive and inductive touch recognition.

In another possible embodiment of the measuring apparatus, however, the control device can also be implemented by push buttons.

In a further possible embodiment of the measuring apparatus, the information carrier is a portable computer device with a screen which is detached from the maintenance apparatus. Such a device is, for example, a laptop, a tablet computer or an intelligent cellular phone, also referred to as a smartphone. The portable computer device is in wireless connection with the maintenance apparatus via the wireless unit of the electronic control unit. For this connection, technology and logs in accordance with the so-called Bluetooth standard, according to the standard of the IEEE 802.11 family, for example wireless LAN, or according to a cellular standard can be used. In this case, the portable computer device can be connected directly to wirelessly connected and/or wired sensors.

Regardless of how the information carrier is designed, in a further possible embodiment, the measuring or maintenance apparatus is arranged such that it stores measurement data received from connected sensors in measurement data logs in an internal data memory of the measuring apparatus. For this purpose, for example, the electronic control unit is set up to temporarily store measurement data from the wired and/or wirelessly connected sensors in the data memory as measurement data logs and link it with further data records.

If, in a further refinement of the measuring apparatus based on the above, a wireless connection is established between said measuring apparatus and a portable computer device with a screen, the measurement data logs are automatically transferred to the portable computer device. This function particularly advantageous when an existing connection between the measurement or maintenance apparatus and a portable computer device with screen temporarily aborts during startup or maintenance of an air conditioning system. As soon as the connection is re-established, measurement data logs recorded in the meantime are transferred to the portable computer device. The technician can then view these on the computer device and no measuring information is lost.

The measuring or maintenance apparatus is set up to be connected to wireless and/or wired pressure and temperature sensors.

The pressure sensors include sensors that measure relative to ambient pressure and also absolute measurement sensors, as well as vacuum sensors.

To be able to use wired sensors, the maintenance apparatus can be equipped with plug connectors.

Radio sensors, on the other hand, have a battery/rechargeable battery cell as a power supply and transmit their measurement data via integrated radio modules. To this end, it is first necessary to couple them to the maintenance apparatus. For this purpose, a function for integrating radio sensors is started on the maintenance apparatus, whereupon accessible activated radio sensors are displayed on the information carrier for selection, for example in a list. These sensors can then be selected and linked to the maintenance apparatus. For this purpose, these radio sensors send an identifier to the maintenance apparatus, which can also be permanently assigned to special functions. For example, a pressure sensor can be assigned for an HP-function and/or display function. Said function is then automatically and permanently recognized as such even when the maintenance apparatus is restarted and can be reused in this function and/or display function.

Optionally, a radio sensor can also be provided with a color code, or it can be permanently configured as an HP or LP sensor using a hidden microswitch. Optionally, the sensor has an internal memory in which it stores measured values so as to hold them in the event of an interruption in the connection until the connection to the maintenance apparatus can be re-established. For this purpose, it is also conceivable that a status display as a lamp or LED changes color when a certain state has occurred, such as a low battery level or a poor or interrupted data connection.

In a further possible embodiment of the measuring apparatus, the wireless sensors are provided with a rechargeable battery as energy storage. To recharge their energy storage, the sensors can be connected to the maintenance apparatus in order to be charged with energy from a main energy storage of the maintenance apparatus. The main energy storage can be a rechargeable battery or also consist of replaceable batteries. The sensors can be connected via a sensor-specific coupling on the maintenance apparatus, into which part of the sensor can be inserted or plugged.

For temperature sensors which are designed in the form of clips, in a further possible embodiment, convexities or protruding strips or pins can be provided on the housing of the maintenance apparatus, on or around which the clips can be closed. Thus, an electrical connection is made via which the energy storage of the sensor is charged.

Wired and wireless temperature sensors can also be assigned an "HP—High Pressure" or "LP—Low Pressure" function. In this context, an HP temperature sensor is to be understood as a temperature sensor that is to be connected in the high-pressure range of an air conditioning system, whereas an LP temperature sensor is to be connected in the low-pressure range of an air conditioning system.

In a further possible embodiment of the measuring apparatus, the information carrier is set up to assign, on the basis of an identification signal transmitted by the external sensor and/or a measuring range transmitted by the external sensor and/or measurement signals transmitted by the external sensor, a low-pressure display function or a high-pressure display function or a negative pressure/vacuum display function to an external sensor.

In a further possible embodiment of the measuring apparatus, the information carrier is set up to display available sensors, wherein if a data connection to a wired sensor is lost, a wirelessly connectable sensor can be or is automatically assigned to the measuring apparatus.

In another possible embodiment of the measuring or maintenance apparatus, the latter intelligently supports the technician in the connection and management of wired and wireless sensors by using specific routines that depend on the sensor type and/or configuration of the maintenance apparatus.

A possible routine in this embodiment is that the maintenance apparatus automatically recognizes a new available wireless sensor and connects to the sensor when no connection to a wired sensor with the same measuring function exists or the connection to a wired sensor is interrupted. For example, if a wireless temperature sensor is detected to which an "HP—High Pressure" function is assigned, and the maintenance apparatus is not connected to a wired HP temperature sensor or the connection to such a wired temperature sensor is interrupted, a connection to a corresponding wireless temperature sensor is established immediately.

Another possible routine in this embodiment is that with the availability of wireless, external pressure sensors, the maintenance apparatus automatically establishes a connection to these and preferably uses their measurement data over measurement data of the internal pressure sensors and displays that data via the information carrier. In this case, a notification on the information carrier signals that the data source has changed. This routine is based on the idea that an external pressure sensor, which is connected directly to an air conditioning system, can generally always deliver less flawed readings regarding the actual pressure conditions in the air conditioning system than the sensors integrated in the maintenance apparatus, since there is always a hose connection between the HP or LP port at the valve block of the maintenance apparatus and the air conditioning system. This hose connection could be squeezed at times and thus hinder the pressure equalization between the air conditioning system and the maintenance apparatus.

In a further possible embodiment of the measuring apparatus, this is set up to establish a radio link to a scale and to receive weighing data from the scale. The scale can be loaded with a pressure vessel that contains a refrigerant. When filling an air conditioner with the refrigerant, the decreasing weight of the pressure vessel can be recorded by the scale and the weight values transmitted to the maintenance apparatus. The information carrier can be used to display both a current absolute weight of the pressure vessel and any weight changes in the pressure vessel during the filling process. The change in the pressure vessel weight then corresponds to the amount of refrigerant filled into the air conditioning system.

If the technician has connected the pressure vessel to the service connection of the valve block on the maintenance apparatus in order to fill the air conditioning system, this configuration offers the advantage that the technician can track the change in the pressure vessel weight directly via the information carrier and can immediately close the check valves on the valve block when the desired mass of refrigerant is discharged from the pressure vessel, via the service connection, the valve block and the LP and/or HP ports of the valve block, into the air conditioning system.

In a further possible embodiment of the measuring apparatus, a switching valve is provided, which is connected to the measuring apparatus by cable or wirelessly, wherein an external sensor is adapted to measure a weight and the switching valve is actuated by the measuring apparatus when a target value of the measured weight has been reached.

In a further possible embodiment of the measuring apparatus, the filling process can be further simplified by the electrical switching valve being operated if a previously defined threshold value of the change in weight is determined by the scale or if another pressure or temperature threshold value is detected by a sensor connected to the maintenance apparatus on the air conditioning system.

This means that the measuring apparatus receives weight data of the container, and, during withdrawal of the refrigerant from the container or filling of the container with refrigerant, and upon reaching the threshold value of the weight of the container, the switching valve closes a fluidic connection between the container and the system, in particular the air conditioning system.

In a further possible embodiment of the measuring apparatus, the switching valve is directly connected to the scale.

Via the radio link to the maintenance apparatus, the scale receives a requirement for the mass of refrigerant which is to be filled into the air conditioning system. The scale then automatically controls the electrical switching valve to regulate the inflow of refrigerant into the air conditioning system.

In a further possible embodiment of the measuring apparatus, the switching valve is connected to the measuring or maintenance apparatus via a radio link or a cable. The measuring or maintenance apparatus then controls, independently or triggered by operator input, the electrical switching valve in order to regulate the inflow of refrigerant into the air conditioning system.

In a further possible embodiment of the measuring apparatus, this is configured to output an audible and/or visual alarm when certain defined states are reached. Examples of such defined states are: Attainment of maximum permissible pressure value; Attainment of maximum permissible temperature value; Exceeding an adjustable variable (pressure, temperature or weight); and/or Occurrence of a low battery.

In this context, a visual alarm is, for example, to be understood as a signaling via the information carrier or, for example, as a flashing or blinking light on the maintenance apparatus.

In a further possible embodiment of the measuring apparatus, when the withdrawal of refrigerant from the container or the filling of the container with refrigerant is interrupted, the electronic control unit is configured to store a withdrawn or refilled refrigerant quantity and, when the withdrawal or filling continues, in particular after the container is exchanged, to add a quantity of the refrigerant that is withdrawn from the container or filled into the container after continuing to the previously stored refrigerant quantity. This function, also known as a hold function, allows for the user to fill the system with refrigerant in a simple, accurate and comfortable manner.

In a further possible embodiment of the measuring apparatus, this can be calibrated in terms of its pressure sensors and/or provided with a software update.

A software update can be imported for example via a memory card, e.g. an SD card, a cable connection to an external computer device, e.g. a USB cable connection, a physical data storage device, for example a USB data storage device, and/or a radio link.

For relative pressure sensors, the calibration of the pressure sensor takes place, for example, either via a correction of a zero point signal upon impingement of the sensor with ambient pressure or via a two-point calibration for relative, absolute pressure and vacuum sensors. In addition, sensor calibration can be carried out by the manufacturer by adjusting the characteristic curves.

Calibration data can be stored in the maintenance apparatus, wherein the maintenance apparatus then uniquely and permanently assigns the calibration data to the pressure sensor, and/or in an internal memory of the pressure sensor.

In a further possible embodiment of the measuring apparatus, this is configured to be connected to an external server via an internet-supported connection. The information carrier can also be configured, in particular in the form of a portable computing device, to be connected to an external server via an internet-supported connection.

This internet-supported connection can be established in various ways, e.g. by means of a radio link to a WLAN router, LoRa, a cellular connection to a cellular tower or a wired connection to a router.

In addition, the information carrier in the form of a portable computing device may also be connected to a further computing device, such as a laptop or desktop PC, via a wired connection. The further computing device is then in internet-supported connection with the server.

Thus, the measuring apparatus enables functionalities for the transfer and use of server-supported data for an application which can be utilized within the scope of a software.

Based on this, in a further possible embodiment of the measuring apparatus, it is possible to exchange logs and/or characteristic data for air conditioning systems and/or customers between the external server, further computing devices as well as the maintenance apparatus and/or the information carrier, wherein logs and/or characteristic data for air conditioners and/or customers are stored or accessed on the server. These data and/or logs may include, but are not limited to: an identifier of an air conditioning system; date information about the startup and/or last maintenance of an air conditioner; measurement data logs from the startup and/or maintenance of an air conditioning system with the maintenance apparatus, wherein the measurement data may include, for example, temperatures, pressures, or hold times achieved for a vacuum, but may also include fixed system data such as cooling capacity, compressor capacity, operating hours, fault conditions, fault types, customer feedback, total power consumption, volume, refrigerant, and other special circumstances; information about a next service appointment for an air conditioner; and/or location information for an air conditioner.

In this context, further computing devices include computing devices such as laptops, desktop PCs and other portable or stationary computing devices that are configured to establish an internet-supported connection to the server.

This also means that fixed, specific system data, such as the refrigerant used or the capacity of a system, including service data which can be linked via web-based applications, can be provided for the long-term to the user of the device, but also to the end customer or for future maintenance intervals.

In another possible embodiment of the measuring apparatus, this is configured to determine its position using a satellite-based positioning system. The information carrier, in particular in the form of a portable computing device, can also be configured to determine its position with the aid of a satellite-based positioning system.

Combined with data on the location of air conditioning systems, which the maintenance apparatus and/or the information carrier can access via an internet-supported connection from a server, said position can be used to determine which air conditioning system is nearby. Data on the nearest air conditioners can be retrieved and displayed via the information carrier.

In another possible embodiment of the measuring apparatus, this is configured to read in a machine-readable marking attached to the air conditioner and to identify the air conditioner on the basis of the read-in machine-readable marking and/or to obtain data about the air conditioner from the read-in machine-readable marking.

Machine-readable markings in this context mean, for example, markings in the form of a graphic symbol, a bar code, a two-dimensional code (e.g. QR code, data matrix code) or a contactless readable chip (e.g. RFID tag, NFC chip/token).

In another possible embodiment of the measuring apparatus, this is configured to establish a radio link with an air conditioning system if this air conditioning system has an air conditioning control and/or communication unit that is equipped with a radio module. Via this radio link, data about the air conditioning system and/or logs, which were previously stored in the air conditioning system control and/or communication unit, can be transmitted to the maintenance apparatus and/or the information carrier.

In a further possible embodiment of the measuring apparatus, this is configured to store and/or retrieve logs via an internet-supported connection from external servers, in particular measurement logs of wireless and/or wired sensors connected to the maintenance apparatus, as well as characteristic data for specific systems and customers. For example, the internet-supported connection can be established via cell phones, a connection in accordance with the standard of the IEEE-802.11 family, for example wireless LAN, or LAN. The logs and data stored on the external servers can also be called up by the technician using a portable computing device or a stationary computer. The maintenance apparatus can use logs and data retrieved from the external servers to intelligently support the technician during maintenance and/or startup, e.g. by displaying measurement logs from past maintenance calls via the information carrier and comparing them with the results of the latest maintenance, or by processing characteristic data of the air conditioning system, such as the optimum fill quantity of refrigerant and the type of refrigerant last filled, and/or displaying them via the information carrier.

Furthermore, this data can also be made available to the end customer via a portal, e.g., a hotel or a company can be provided with an overview of all its air conditioning systems with a respective "health status", which displays, e.g., the following parameters: air temperature, cooling capacity, cycles, on/off status, maintenance cycles and/or, via the calculation of the above-mentioned data, a recommendation for the next maintenance appointment or a suggested list for a sensible order for the next maintenance technician visit. Via this portal, the maintenance technician can also provide all logs, if necessary also invoices and other data.

In another possible embodiment of the measuring apparatus, this comprises a lockable device for securing it as an anti-theft device, or eyelets are integrated into the housing of the measuring or maintenance apparatus by means of which the measuring or maintenance apparatus can be secured with a lock.

In a further possible embodiment of the measuring apparatus, this can be connected with at least two or at least four wireless and/or wired temperature sensors and with at least one or at least two external wireless and/or wired pressure sensors, and the measuring or maintenance apparatus receives and processes the measurement data from all these sensors simultaneously or sequentially.

Furthermore, the maintenance apparatus accesses, for example, refrigerant-specific auxiliary tables that are stored in the data memory of the maintenance apparatus. For example, upon the technician's request, the maintenance apparatus processes the received sensor data and calculates an efficiency of an air conditioner from it using the refrigerant-specific auxiliary tables, and outputs it via the information carrier.

Refrigerant-specific auxiliary tables are understood to be, in particular, tables which comprise specific enthalpy values of the refrigerant that are separated at least in terms of pressure and temperature.

The measuring apparatus facilitates and/or improves the maintenance and startup of air conditioning systems in that a plurality of sub-steps of a startup and/or maintenance of an air conditioning system are improved by new methods in which the measuring or maintenance apparatus is used. Such sub-steps are, for example, checking the tightness of the air conditioning system, measuring the temperature on the air conditioning system as well as determining the efficiency of the air conditioning system.

A system according to the invention for performing measurement tasks and for managing measurement data comprises at least one measuring apparatus, at least one information carrier, which is, for example, a component of the measuring apparatus, at least one cloud server with a cloud application, and at least one user account in the cloud application. The measuring apparatus and/or the information carrier is/are associated with the user account. The measuring apparatus and/or the information carrier is/are linked to the user account, for example, during an initial login to the user account. The measuring apparatus provides measurement data logs associated with the user account, and the measuring apparatus and/or the information carrier and/or the cloud application link further data records to the measurement data logs.

In one possible embodiment of the system, said system comprises a computing device, wherein the computing device or the information carrier is associated with the user account, and wherein the measuring apparatus and/or the information carrier exchange measurement data logs and/or further data records with the computing device. For this purpose, no data connection to the cloud server is available or required, or any existing data connection to the cloud server is interrupted during the exchange.

In another possible embodiment of the system, the function carrier or computing device is associated with the user account, wherein on the computing device and/or the information carrier, certain storage and analysis functions are activated only after a link or initial login to a user account on the cloud server has taken place.

In another possible embodiment of the system, during an initial connection or during a connection setup, an identification of the measuring apparatus is linked to an identification of the information carrier or a computing device and with a user account on the cloud server. For this purpose, an IMEI number, a mobile phone number and/or an email address are or will be linked to a user and a password as a login ID.

In a further possible embodiment of the system, various systems or air conditioning systems are assignable or associated with the user account, wherein an ID number of a system or air conditioning system is stored in the user account, under which ID number a data record with measurement data of a system or air conditioning system is or can be stored.

In another possible embodiment of the system, a GPS position, an image, a movie, or a customer reference are or can be associated with the data record of a system.

In a possible method for starting up and/or maintaining an air conditioner with the maintenance apparatus, the leakage test of the air conditioner is improved by performing the following steps: Connection of the HP portion of the air conditioner to the HP port of the maintenance apparatus and connection of the LP portion of the system to the LP port of the maintenance apparatus; Opening the two check valves on the maintenance apparatus and evacuating the air conditioning system with a vacuum pump until a lowest pressure is reached, depending on the power of the pump; Shutting down the pump, closing the check valves on the maintenance apparatus and recording the pressure increase due to leakage in the air conditioner using the internal sensors of the maintenance apparatus or using wired and/or wireless pressure sensors connected to the maintenance apparatus for a certain time period t1; Extrapolating the measurement data recorded over the time period t1, either to determine a time period t2 according to which a certain pressure threshold value is expected to be reached due to leakage in the air conditioning system and outputting this time period via the information carrier, or to output a pressure threshold value that is expected to be reached after a fixed time t3, which is greater than the time period t1, due to leakage in the air conditioning system, or calculating and outputting a leakage rate based on the measurement data recorded over the time period t1.

This method offers the technician the advantage that the test can be carried out in a short time and said technician can use either the determined time t2 or the pressure threshold value determined at the time t3 as a reference value to decide when the system should be next serviced at the latest.

A leakage rate can be analyzed as an important characteristic value of the system in order to decide as to whether the system may be operated. In order for the maintenance apparatus to determine an absolute leakage rate, a characteristic value for the internal volume of the air conditioning system must be entered by the technician.

In another possible method for starting up and/or maintaining an air conditioning system with the maintenance apparatus, the air conditioner leakage test is improved by performing the following steps: Connecting the HP portion of the installation to the HP port of the maintenance apparatus and connection of the LP portion of the installation to the LP port of the maintenance apparatus; Pressurizing the air conditioning system with a pressure from a pressure source that is higher than the ambient air pressure; Disconnecting the pressure source and recording the pressure drop due to leakage in the air conditioner using the internal sensors of the maintenance apparatus or using wired and/or wireless pressure sensors connected to the maintenance apparatus for a certain time period t1; Extrapolating the measurement data recorded over the time period t1, to determine either a time period t2 after which a certain pressure threshold value is reached due to leakage in the air conditioning system and outputting this time period via the information carrier, or to output a pressure limit value which is expected to be reached in a fixed time t3 due to leakage in the air conditioning system, or calculation and output of a leakage rate based on the measurement data recorded over the time period t1.

As with the vacuum leakage test described above, this leakage test with overpressure also offers the technician the advantage that the test can be carried out in a short time, and the technician can use either the determined time t2 or the determined pressure limit value at time t3 as a reference point to decide when the system should be next serviced at the latest.

The extrapolation of the measurement data and the calculation of certain characteristic values in both leakage testing methods can be carried out directly by the measuring or maintenance apparatus or the information carrier.

In another possible method for starting up and/or maintaining an air conditioning system with the maintenance apparatus, the temperature measurement on pipelines of the air conditioner is improved by performing the following steps: Connecting at least one wired or wireless temperature sensor to the maintenance apparatus; Establishing thermal contact of the at least one temperature sensor with a pipeline of the air conditioning system for determining the temperature on a surface of the pipeline; Connecting at least one further wired or wireless temperature sensor to the maintenance apparatus for determining an ambient temperature or determining an ambient temperature by means of a temperature sensor integrated in the maintenance apparatus; and Using the measured surface temperature of the pipeline and the ambient temperature measured by the maintenance apparatus to calculate a real temperature of the refrigerant in the pipeline and outputting it via the information carrier.

This improved temperature measurement method provides the technician with the advantage of eliminating a temperature measurement error due to a temperature gradient between an inside of a pipeline in thermal contact with the refrigerant and an outside of the pipeline in thermal contact with the ambient air, thereby more precisely determining an actual real temperature of the refrigerant in the air conditioning system.

To calculate the real temperature of the refrigerant in the pipeline, the maintenance apparatus in the described method uses, for example, predefined material properties and geometry data for the pipeline which correspond to standard values applied by the industry.

In a possible method based thereon for starting up and/or maintaining an air conditioning system with the maintenance apparatus, the temperature measurement on air conditioning pipelines using the measured pipeline surface temperature and the measured ambient temperature is improved in that the technician can input specific material properties and/or geometry data of the pipeline such that the maintenance apparatus calculates a real temperature of the refrigerant in the pipeline, taking into account this specific data, and outputs it via the information carrier.

In another possible method for starting up and/or maintaining an air conditioner with the maintenance apparatus, determining the efficiency of the air conditioner is improved by performing the following steps: Installing the at least two, or at least four, temperature sensors connected to the maintenance apparatus and the at least one, or the at least two, external pressure sensors connected to the maintenance apparatus on the air conditioning system and connecting the internal pressure sensors of the maintenance apparatus to the air conditioning system in such a way that at least two of the following four temperature & pressure value pairs are measured: a) Temperature and pressure upstream of the expansion valve; b) Temperature and pressure downstream of the expansion valve; c) Temperature and pressure of the evaporator; d) Temperature and pressure downstream of the evaporator; e) Temperature and pressure upstream of the compressor; f) Temperature and pressure downstream of the compressor; and assignment of corresponding functions to the respective sensors; and/or Receiving and processing the measurement data of all connected sensors by the maintenance apparatus and using refrigerant-specific auxiliary tables to calculate a real efficiency of the air conditioner according to the definition of the measures EER or COP.

Assigning the corresponding functions to the respective sensors means, for example, that the technician configures on the maintenance apparatus or the information carrier which sensor is installed at which measuring position.

For example, the technician is shown a sensor identification or marking via the information carrier for each connected sensor, with which the technician can identify without any doubt which sensor should be assigned the selected function, i.e. the selected measuring position, on the maintenance apparatus. This is done for all connected sensors.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
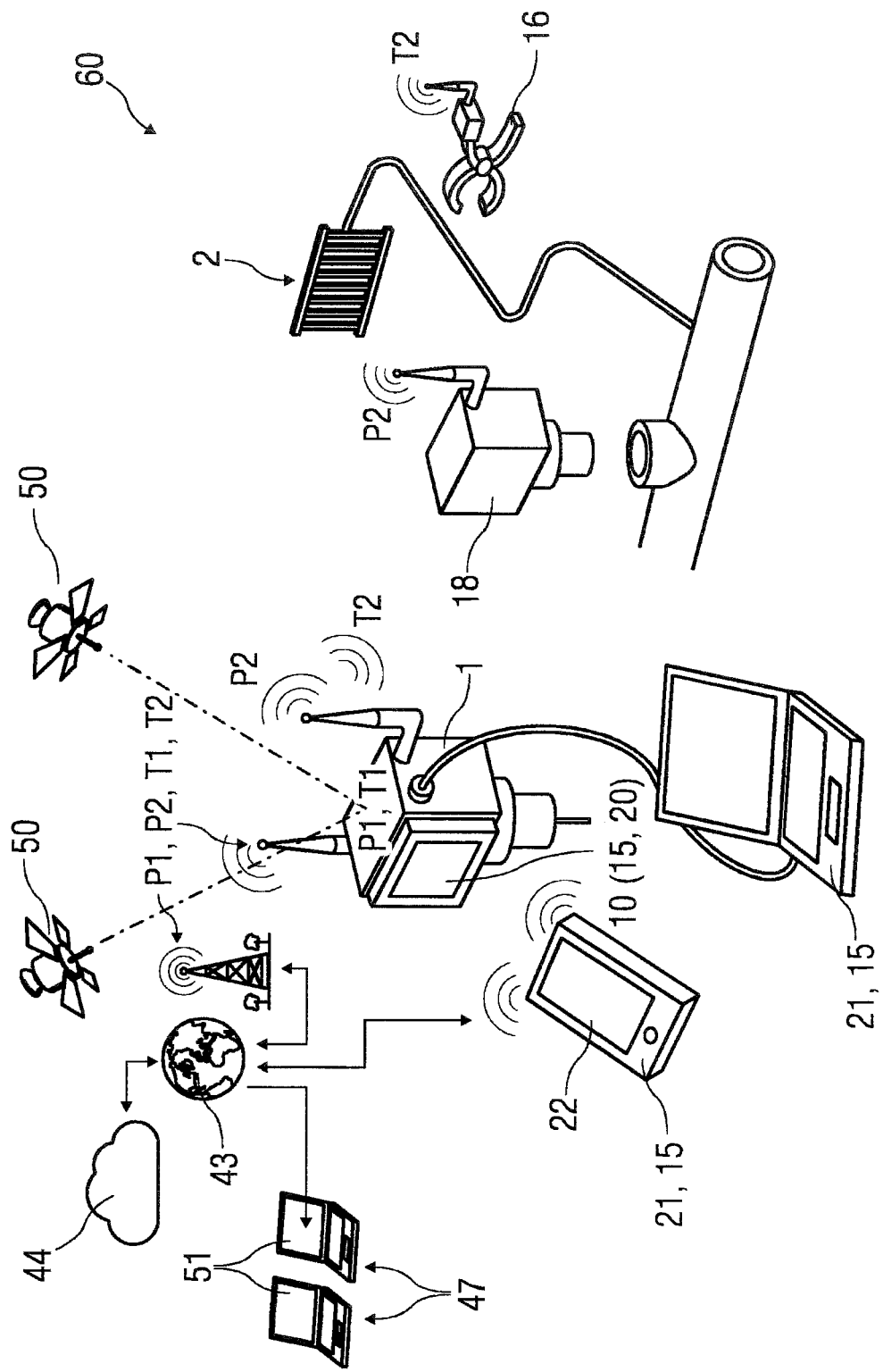
FIG. 1A schematically a system for performing measurement tasks and managing measurement data, FIG. 1B schematically an arrangement of a measuring apparatus, a system and a pump, FIG. 1C schematically a possible embodiment of an intelligent maintenance apparatus during startup or maintenance of an air conditioning system, FIG. 1D schematically an arrangement of a maintenance apparatus, an air conditioner and a cloud server during startup or maintenance of an air conditioner, FIG. 2 schematically another possible embodiment of the intelligent maintenance apparatus during startup or maintenance of an air conditioning system, FIG. 3A schematically a possible embodiment of the intelligent maintenance apparatus as well as external wireless sensors, FIG. 3B schematically a possible embodiment of the intelligent maintenance apparatus and external wireless and wired sensors, FIG. 4A schematically another possible embodiment of the intelligent maintenance apparatus and external wireless sensors FIG. 4B schematically another possible embodiment of the intelligent maintenance apparatus and external wireless and wired sensors, FIGS. 5A to 5D schematically four possible embodiments of a connection between a housing and a wireless temperature sensor for charging the energy storage of the temperature sensor, FIG. 6A schematically a possible embodiment of the intelligent maintenance apparatus with a scale and a wired electrical switching valve connected to the scale, FIG. 6B schematically a possible embodiment of the intelligent maintenance apparatus with a scale and a wireless electric switching valve, FIG. 7A schematically a pipeline for a refrigerant in cross-section with a temperature sensor in thermal contact, FIG. 7B schematically a qualitative radial temperature curve from the center of a pipeline to beyond the outer surface of a pipeline, FIG. 8A schematically a communication arrangement in which an embodiment of the intelligent maintenance apparatus is connected to a server via a WLAN router and an internet-supported connection, FIG. 8B schematically a communication arrangement in which an embodiment of the intelligent maintenance apparatus is connected to a cellular tower via a cellular connection and to a server via an internet-supported connection, FIG. 8C schematically a communication arrangement in which an embodiment of the intelligent maintenance apparatus is connected in a wired manner to a server via a router and an internet-supported connection, FIG. 9A schematically a communication arrangement in which an embodiment of the intelligent maintenance apparatus is connected to a server via a portable computing device and via a WLAN router and an internet-supported connection, FIG. 9B schematically a communication arrangement in which an embodiment of the intelligent maintenance apparatus is connected to a server via a portable computing device and via a cell phone connection to a cell tower and an internet-supported connection, FIG. 9C schematically a communication arrangement in which an embodiment of the intelligent maintenance apparatus is connected to a server via a portable computing device and in a wired manner via a router and an internet-based connection, and FIG. 10 schematically a possible embodiment of the intelligent maintenance apparatus and a portable computing device as information carrier in the center of a communication arrangement.

FIG. 1A illustrates a system 60 for performing measurement tasks and managing measurement data.

The system 60 comprises a measuring apparatus 1, hereinafter also referred to as a maintenance apparatus 1, which is described in more detail in the following figures by means of various exemplary embodiments.

The measuring apparatus 1 is linked to a system or an air conditioning system 2 and comprises internal sensors for detecting a pressure P1 and a temperature T1 of a medium carried in the system or a refrigerant carried in the air conditioner 2.

The measuring apparatus 1 comprises an information carrier 15 with a screen unit 20. The measuring apparatus 1 may also be linked to an information carrier 15 designed as a portable computing device 21, which includes a screen 22.

In the event of simultaneous availability of wired or wirelessly connected sensors, presently for example an external wireless pressure sensor 18 and an external wireless temperature sensor 16, the information carrier 15 is configured to provide and display as priority either the data from the wired sensors or the data from the wirelessly connected sensors.

A second pressure P2 is determined by means of the wireless pressure sensor 18. A second temperature T2 is determined by means of the wireless temperature sensor 18. The pressure P2 and the temperature T2 are transmitted to the information carrier 15 via a wireless connection from the external pressure sensor 18 and the external temperature sensor 16, respectively.

Further, the information carrier 15 is configured to indicate available sensors, wherein in the event of loss of a data link to a wired sensor, the measuring apparatus 1 is automatically assigned a wirelessly connectable sensor.

Further, the information carrier 15 is configured to use or display measurement data from an external wired or wirelessly connected sensor as priority over measurement data from the internal sensor.

In this case, the information carrier 15 detects an external sensor based on an identification signal transmitted from the external sensor and/or a measuring range transmitted from the external sensor, and/or assigns a low-pressure indication function or a high-pressure indication function or a negative pressure vacuum display function to the measurement signals transmitted from the external sensor.

Here, the data from the sensor treated as priority is processed, analyzed and/or displayed on the screen 22 by the information carrier 15, whereas the data from the other sensor is not processed, analyzed and/or displayed on the screen 22, or at least not processed, analyzed and/or displayed on the screen 22 simultaneously.

The measuring apparatus 1 is connected to a cloud server 44 via an internet-supported connection 43.

Figure 1B:
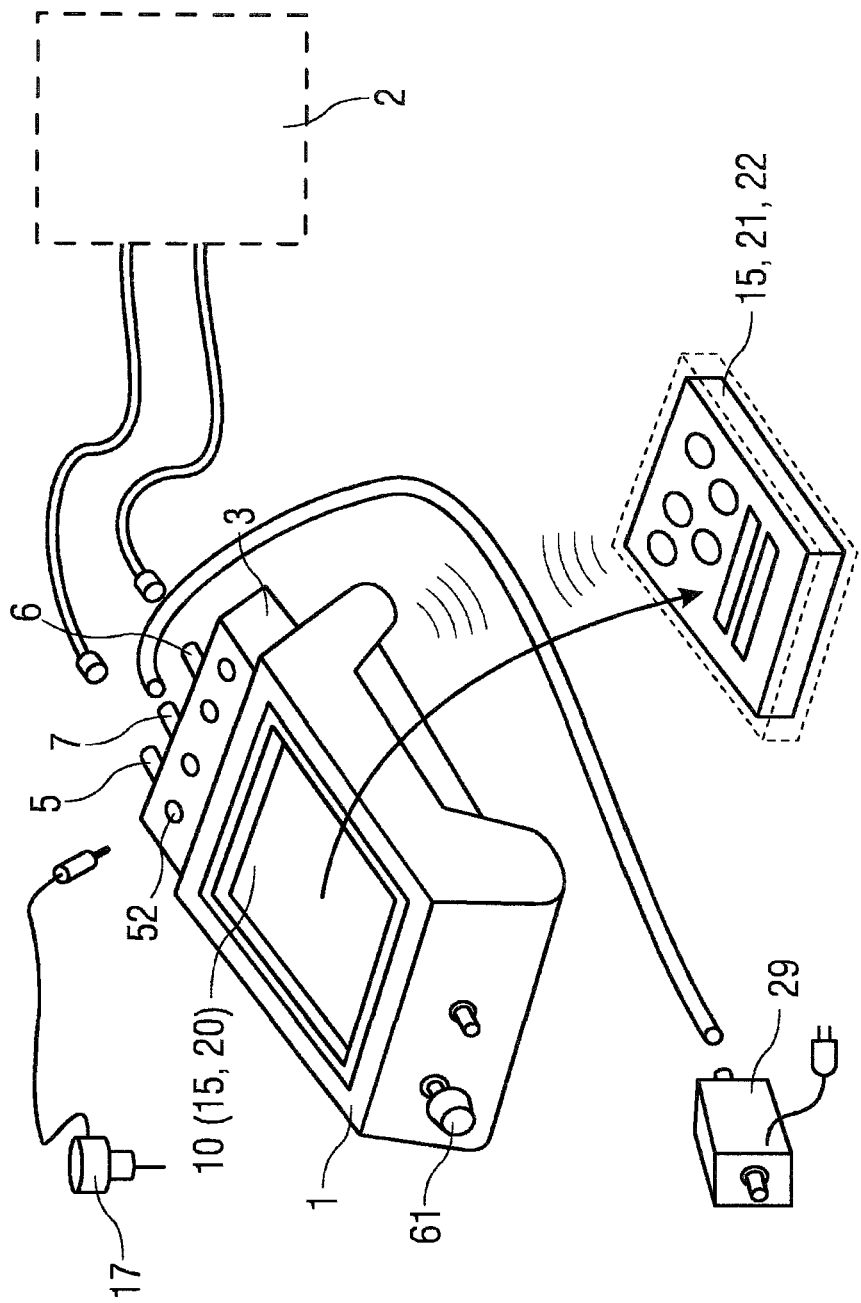
Figure 1C:
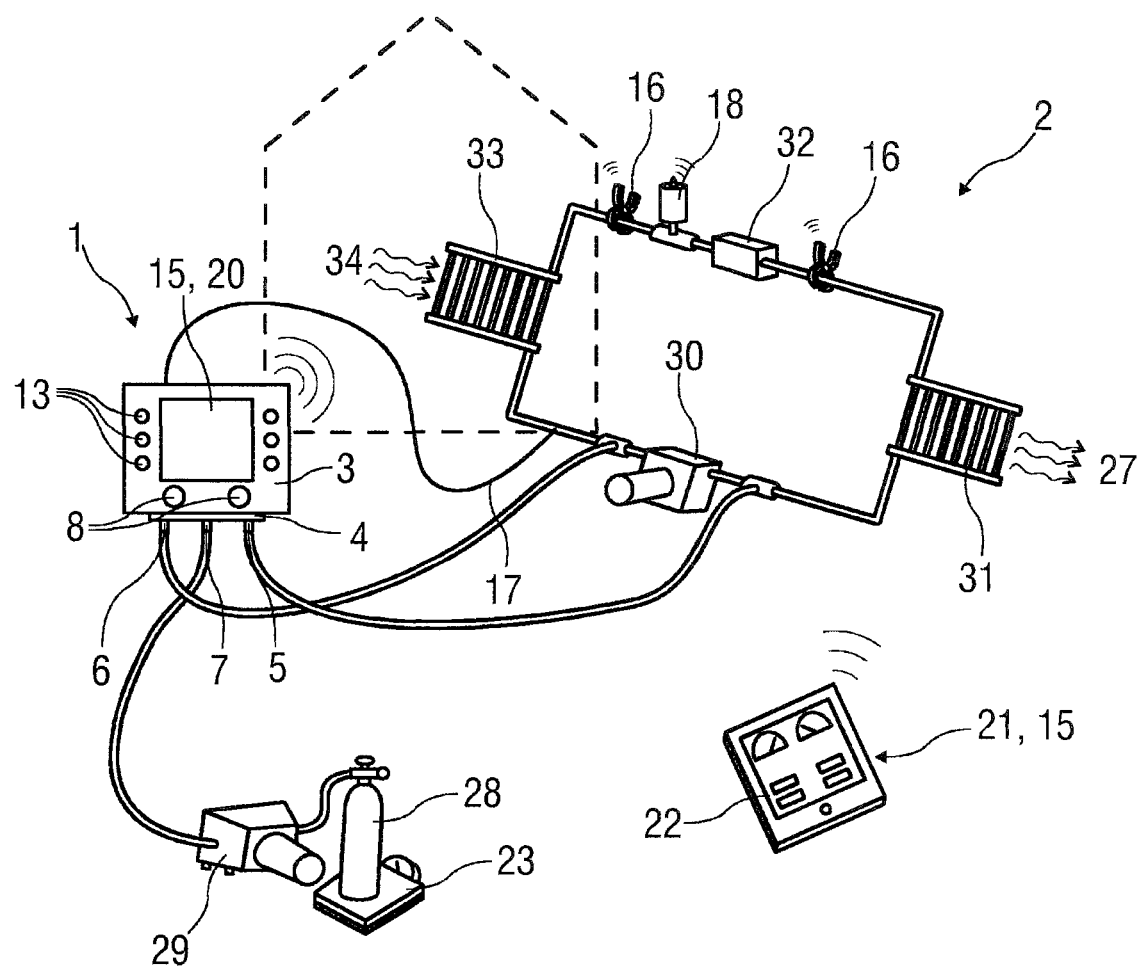
Figure 1D:
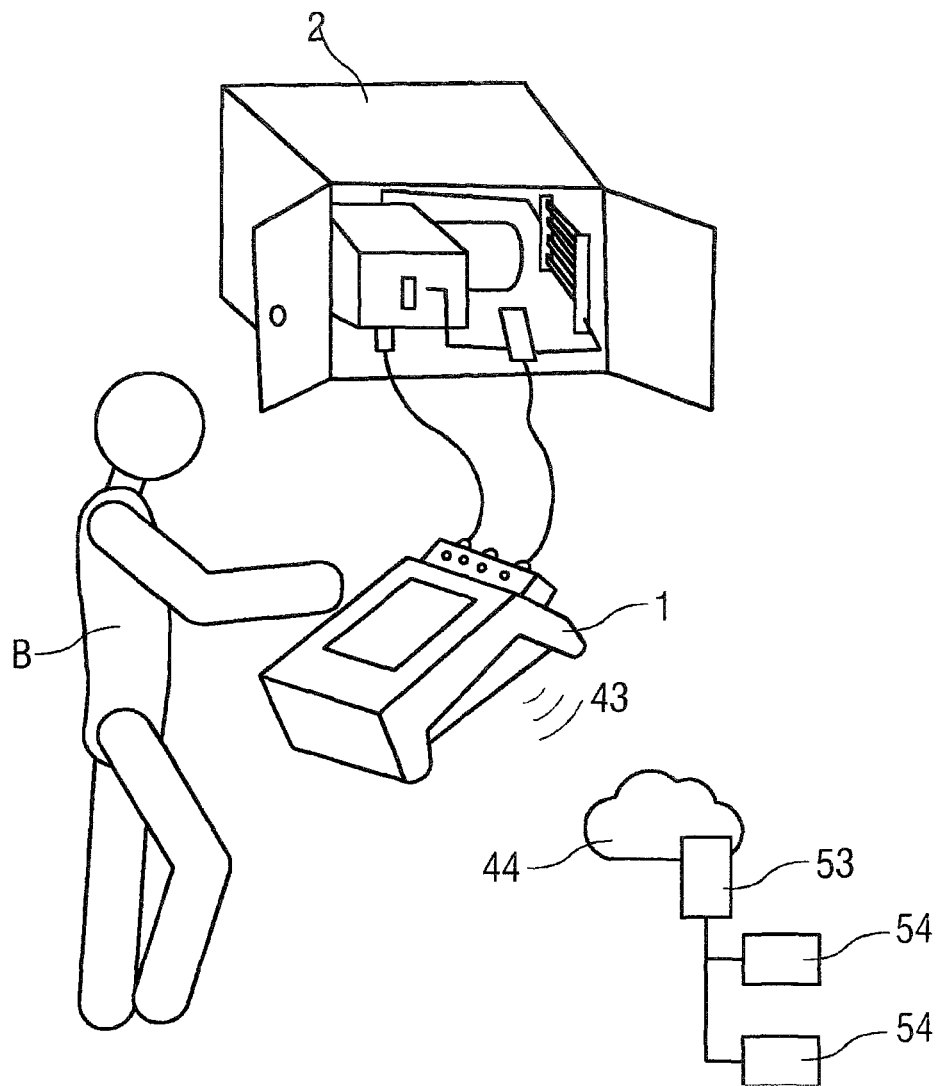

The cloud server 44 comprises a cloud application and at least one user account 53 in the cloud application, shown in more detail in FIG. 1D. The measuring apparatus 1 and/or the information carrier 15 is or are associated with the user account 53.

The measuring apparatus 1 provides measurement data logs with the pressures P1 and/or P2 and the temperatures T1 and/or T2, which are associated with the user account 53. In addition, the measuring apparatus 1 and/or the information carrier 15 and/or the cloud application can link further data records 54, shown in more detail in FIG. 1D, with the measurement data logs.

The computing device 21 or the information carrier 15 are associated with the user account 53, wherein the measuring apparatus 1 and/or the information carrier 15 exchange measurement data logs and/or further data records 54 with the computing device 21, wherein no data connection to the cloud server 44 is required for this exchange or an existing data connection to the cloud server 44 is interrupted during the exchange.

On the function carrier 15 associated with the user account 53 or on the computing device 21 associated with the user account 53, certain storage and analysis functions are enabled, for example, only after a user account 53 has been linked or initially logged in to the cloud server 44.

For example, during an initial connection or during a connection setup, an identification of the measuring apparatus 1 is linked to an identification of the information carrier 15 and/or the computing device 21 and to a user account 53 on the cloud server 44, wherein for this purpose an IMEI number, a mobile phone number and/or an email address is or are paired with a user B and a password shown in more detail in FIG. 1D.

Furthermore, the user account 53 is assignable or associated with various systems or air conditioners 2, wherein in the user account 53, an ID number of a system or air conditioning system 2 is stored under which a data record 54 with measurement data of a system or air conditioning system 2 can be stored or is stored.

Further, a GPS location, image, movie, or customer reference is assignable or associated with the data record 54 of a system or air conditioner 2.

Furthermore, the system 60 comprises a satellite-based positioning system 50. Both the air conditioner 2 and the information carrier 15 may be connected to this satellite-based positioning system 50, and thereby determine their geo-positions and transmit these, together with the data records, to the cloud server 44.

Also, other computing devices 47 may be connected to the cloud server 44 via the internet-supported connection 43. The cloud server 44 provides these with information, such as system data and measurement logs 51, which can be retrieved and displayed by the computing devices 47.

FIG. 1B shows a possible arrangement of a measuring apparatus 1 (maintenance apparatus 1), a system 2 or air conditioning system 2, and a pump 29 which can be linked to the measuring apparatus 1.

Furthermore, a pressure sensor 19 is shown, which can be linked by cable to the measuring apparatus 1 via its own connection 52. The connection 52 can also be designed as a media socket, for example for current and voltage.

The measuring apparatus 1 includes a housing 3, a high-pressure/HP port 5, a low-pressure/LP port 6, and a service port 7, as well as an electronic control unit 10 and/or, if applicable, a portable computing device 21 with a screen 22 as a further information carrier 15.

A hose connection connects the high-pressure/HP connection 5 to the HP portion of the system 2.

Another hose connection connects the low-pressure/LP port 6 to the LP portion of the system 2.

By means of another hose connection, the service port 7 can be connected to an input of the pump 29.

The measuring apparatus 1 may further comprise a pressure generating device 61, which is formed, for example, by a manually operated pump or an electric pump.

FIG. 1C shows a possible embodiment of an intelligent maintenance apparatus 1 during maintenance or startup of an air conditioning system 2.

The maintenance apparatus 1 is shown with a housing 3, a valve block 4, a high-pressure/HP port 5, a low-pressure/LP port 6, a service port 7, two check valves 8, several buttons as operating device 13, a screen unit 20 as information carrier 15, a portable computing device 21 with a screen 22 as a further information carrier 15, two external wireless temperature sensors 16, an external wireless pressure sensor 18, a wired pressure sensor 19 as well as three connected hose connections.

A hose connection connects the high-pressure/HP port 5 to the HP portion of the air conditioner 2 by connecting to piping at the outlet of a compressor 30.

Another hose connection connects the low-pressure/LP port 6 to the LP portion of the air conditioner 2 by connecting to the piping at the inlet of the compressor 30.

Another hose connection connects the service port 7 to an inlet of a pump 29, which in turn is connected to a compressed gas cylinder 28, wherein the compressed gas cylinder 28 stands on a scale 23.

The air conditioning system 2 is represented by the main components compressor 30, liquefier/condenser 31, expansion valve 32 and evaporator 33. In the liquefier/condenser 31, a refrigerant gives off heat energy (=heat output 27), in the evaporator 33 it absorbs heat energy (=heat absorption 34).

FIG. 1D shows an arrangement of a measuring apparatus 1 (maintenance apparatus 1), an air conditioner 2 and a cloud server during startup or maintenance of an air conditioner 2.

The measuring apparatus 1 is connected to the cloud server 44 via the internet-supported connection 43.

The cloud server 44 includes the cloud application and at least one user account 53 in the cloud application. The measuring apparatus 1 and/or the information carrier 15 are associated with the user account 53.

As a result, the measuring apparatus 1 provides measurement data logs in the form of data records 54 that are associated with the user account 53. In addition, the measuring apparatus 1 and/or the information carrier 15 and/or the cloud application can link further data records 54 to the measurement data logs.

For example, various systems or air conditioning systems 2 are assignable or associated with the user account 53, wherein an ID number of a system or air conditioning system 2 is stored in the user account 53 under which a data record 54 with measurement data of a system or air conditioning system 2 is or can be stored.

Further, a GPS location, image, movie, or customer reference is assignable or associated with the data record 54 of a system or air conditioner 2.

Figure 2:
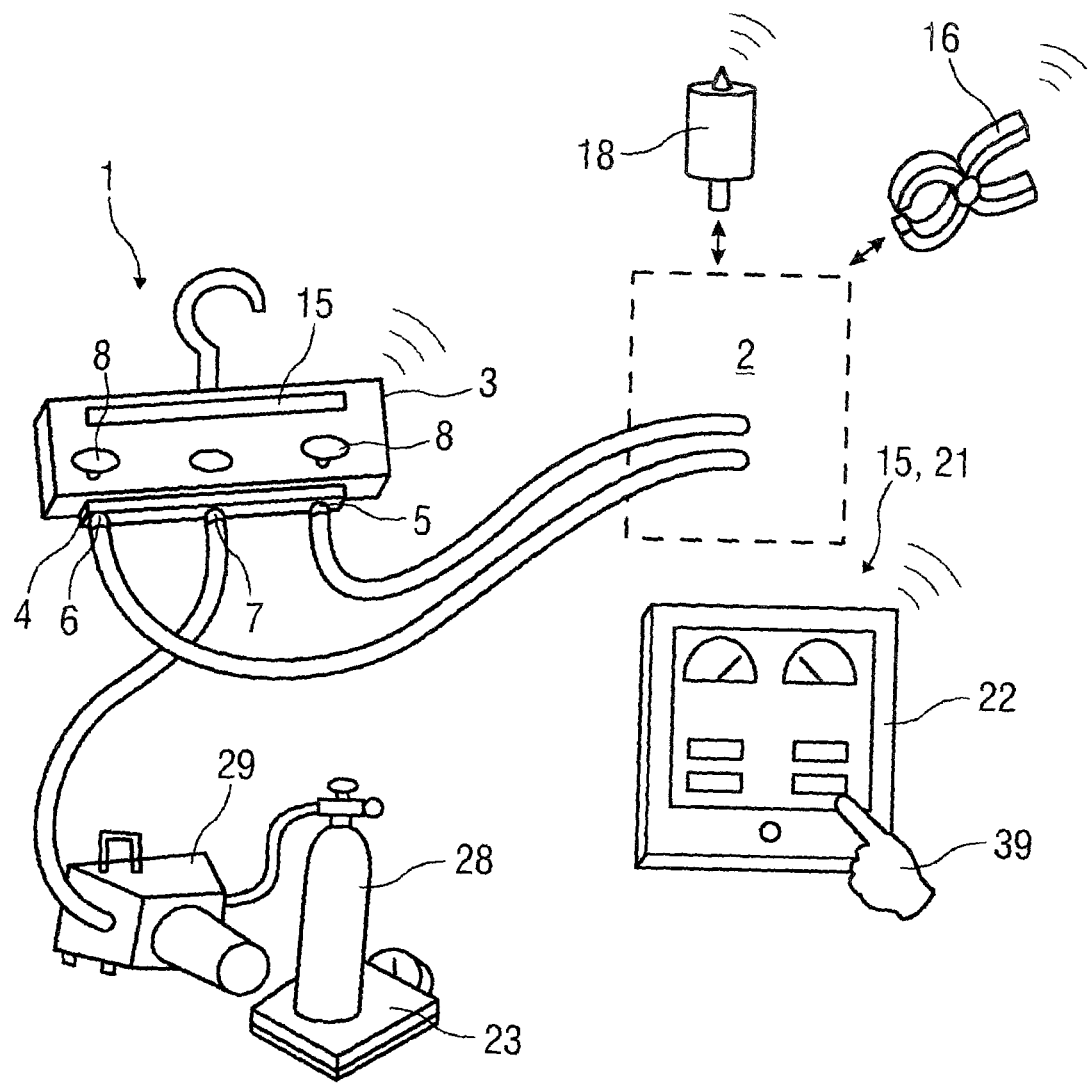

FIG. 2 shows a further embodiment of the intelligent maintenance apparatus 1 during maintenance or startup of an air conditioning system 2.

The maintenance apparatus 1 is shown with a housing 3, a valve block 4, a high-pressure/HP port 5, a low-pressure/LP port 6, a service port 7, two check valves 8, an information carrier 15, a portable computing device 21 with a screen 22 as a further information carrier 15, an external wireless temperature sensor 16, an external wireless pressure sensor 18, and three connected hose connections.

A hose connection connects the high-pressure/HP connection 5 to the HP portion of the air conditioner 2.

Another hose connection connects the low-pressure/LP port 6 to the LP portion of the air conditioner 2.

Another hose connection connects the service port 7 to the inlet of a pump 29, which in turn is connected to a compressed gas cylinder 28, wherein the compressed gas cylinder 28 stands on a scale 23.

The air conditioner 2 is indicated schematically by a dashed frame. At the portable computing device 21, operator input by touch 39 is schematically indicated.

Figure 3A:
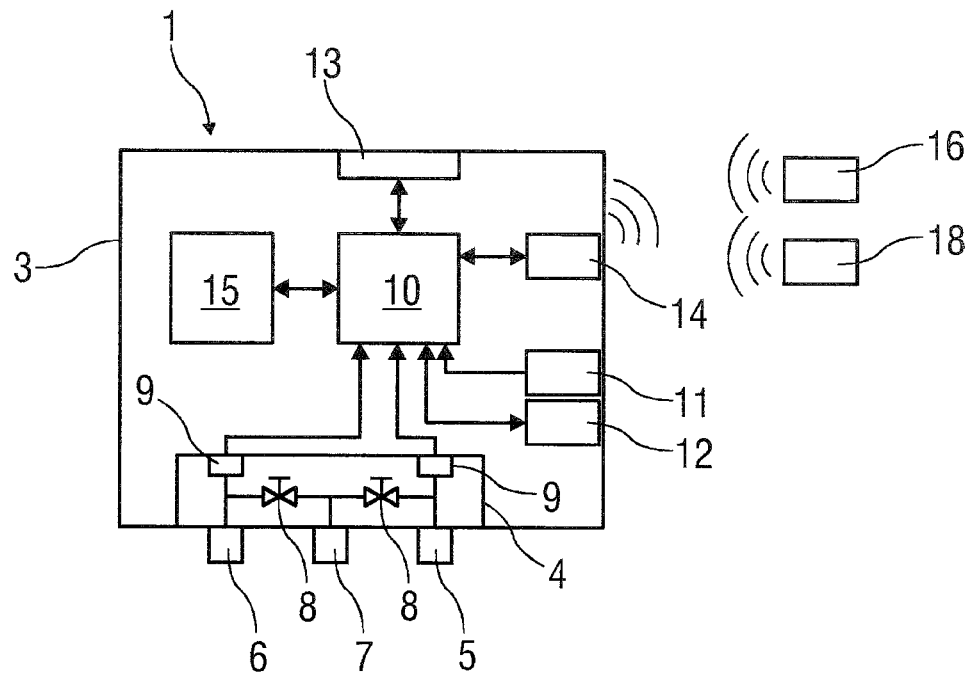

FIG. 3A schematically illustrates a possible embodiment of the intelligent maintenance apparatus 1.

The maintenance apparatus 1 is shown with a housing 3, a valve block 4, a high-pressure/HP port 5, a low-pressure/LP port 6, a service port 7, two check valves 8, two internal pressure sensors 9, an electronic control unit 10, a main energy storage 11, a data memory 12, an operating device 13, a radio module 14, an information carrier 15, an external wireless temperature sensor 16 and an external wireless pressure sensor 18. The maintenance apparatus 1 is in radio communication with the shown wireless sensors 16, 18 via its radio module 14.

Figure 3B:
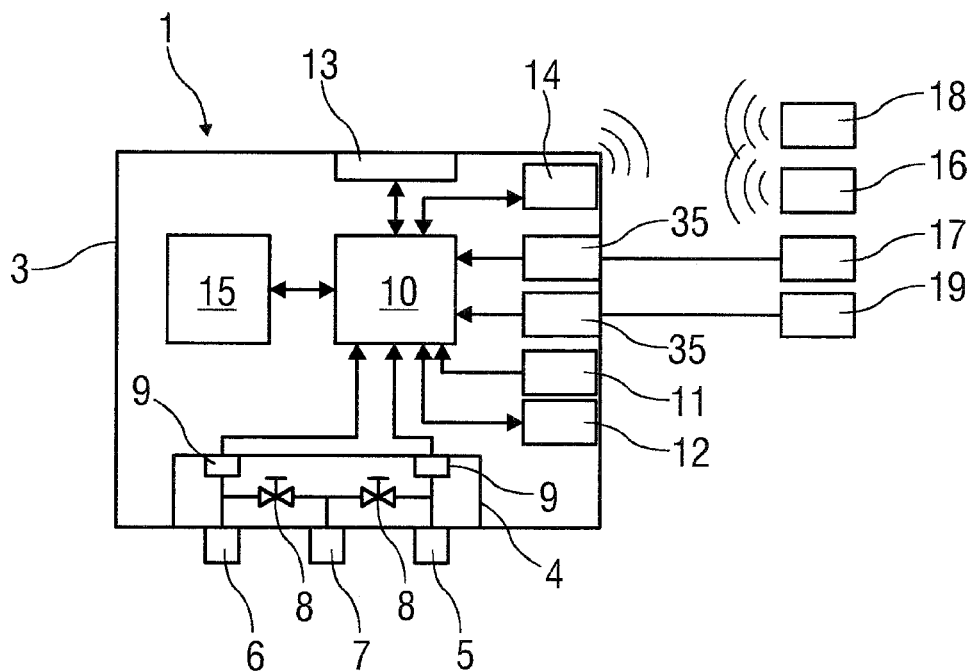

FIG. 3B schematically illustrates another possible embodiment of the intelligent maintenance apparatus 1.

In addition to the components already shown in FIG. 3A, the maintenance apparatus 1 in FIG. 3B is shown with two cable connections 35, a wired temperature sensor 17 and a wired pressure sensor 19.

Figure 4A:
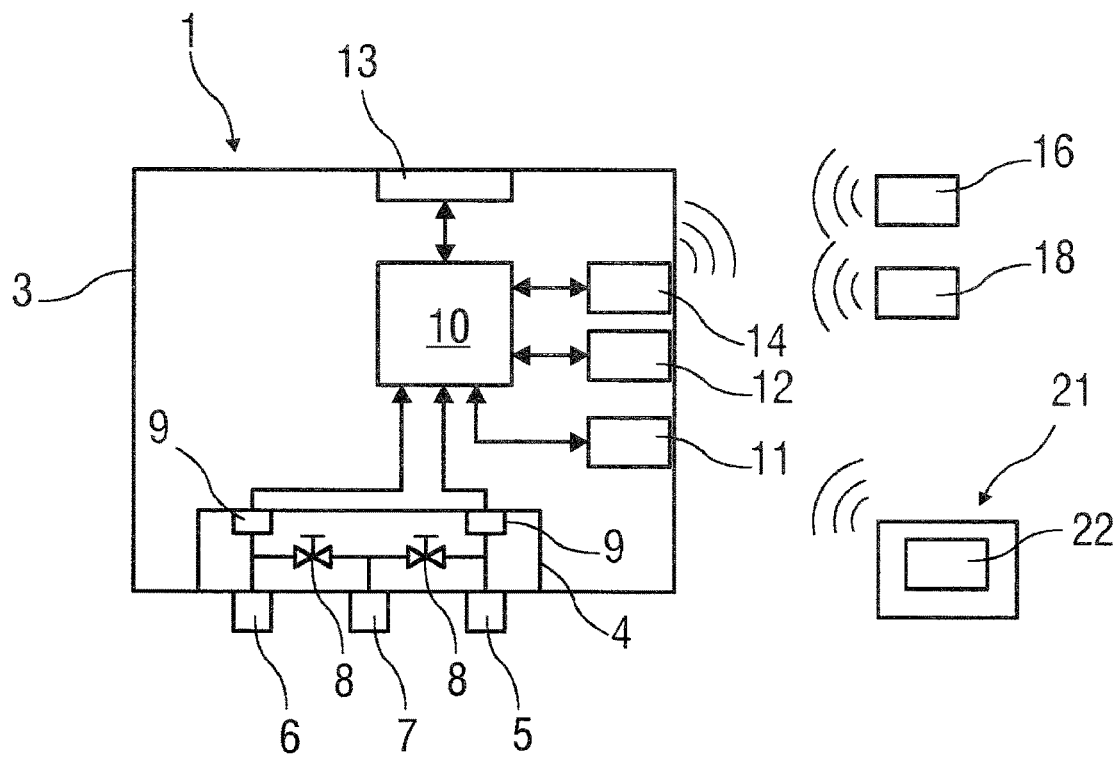

FIG. 4A schematically illustrates another possible embodiment of the intelligent maintenance apparatus 1.

The maintenance apparatus 1 is shown with a housing 3, a valve block 4, a high-pressure/HP port 5, a low-pressure/LP port 6, a service port 7, two check valves 8, two internal pressure sensors 9, an electronic control unit 10, a main energy storage 11, a data memory 12, an operating device 13, a radio module 14, an external wireless temperature sensor 16, an external wireless pressure sensor 18, and with an external portable computing device 21 including a screen 22. The maintenance apparatus 1 is in radio communication with the shown wireless sensors 16, 18 and with the portable computer unit 21 via its radio module 14.

Figure 4B:
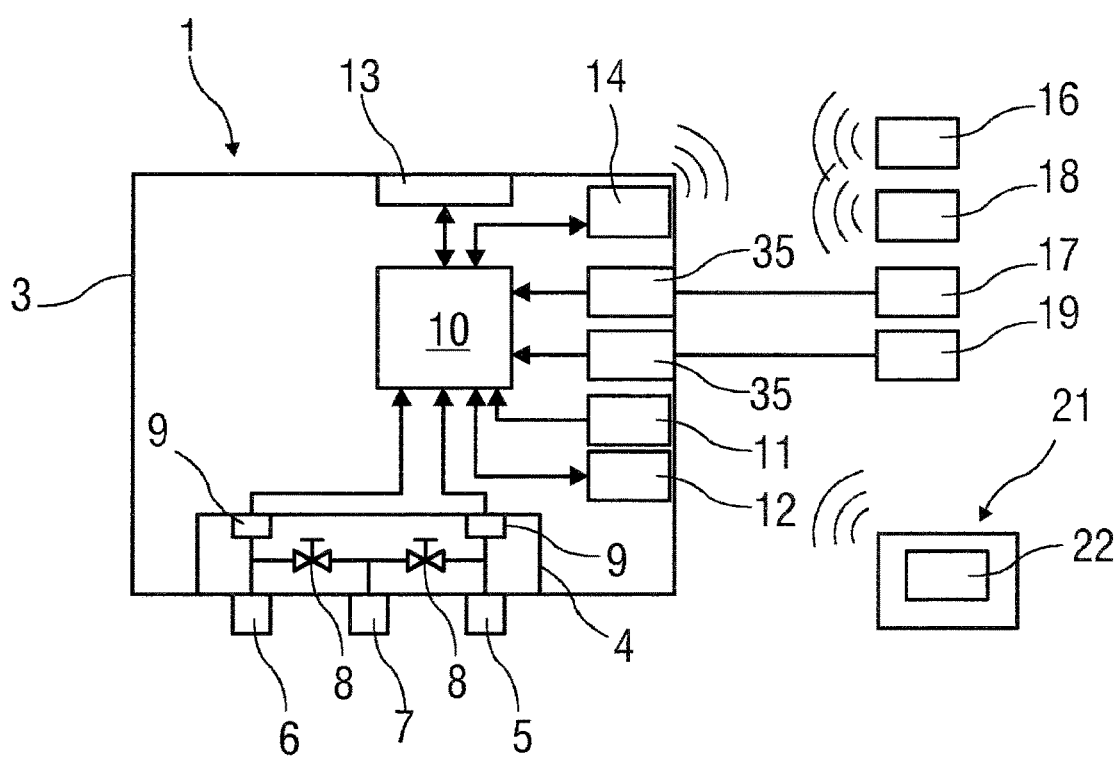

FIG. 4B schematically shows another possible embodiment of the intelligent maintenance apparatus 1.

In addition to the components already shown in FIG. 4A, the maintenance apparatus 1 is shown in FIG. 4B with two cable connections 35, a wired temperature sensor 17 and a wired pressure sensor 19.

FIGS. 5A through 5D show four options in which an external wireless temperature sensor 16 can be connected to a housing 3, for example, so that an internal energy storage device of the wireless temperature sensor 16 is connected to electrical charging contacts 40 on the housing 3 and can be charged via said contacts.

Figure 5A:
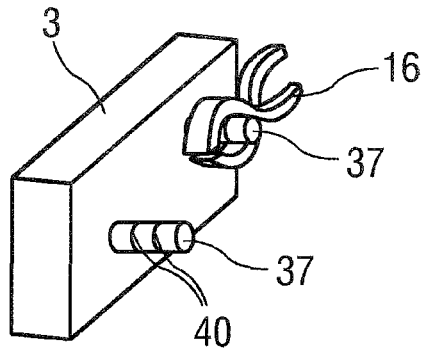

FIG. 5A shows the housing 3 with cylindrical or conical protrusions 37 around which a clamp-type wireless temperature sensor 16 can be clamped. The electrical charging contacts 40 are shown, by way of example, as annular elements disposed on the outer surface of the protrusion 37.

Figure 5B:
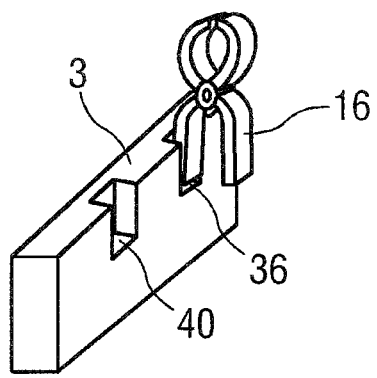

FIG. 5B shows the housing 3 with sensor couplings 36 around which a wireless temperature sensor 16, but also another sensor, can be inserted or plugged in. The electrical charging contacts 40 are shown by way of example as contact points on a bottom surface of the sensor coupling 36.

Figure 5C:
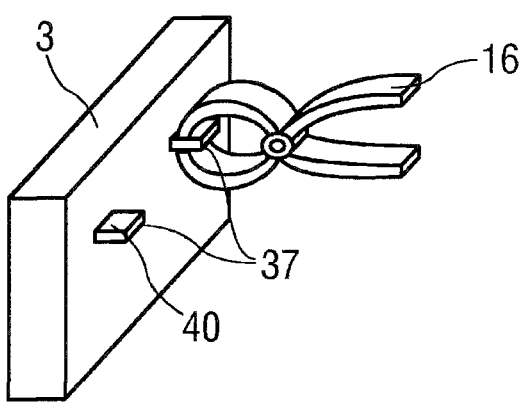

FIG. 5C shows the housing 3 with rectangular-shaped protrusions 37 onto which a clamp-type wireless temperature sensor 16 can be clamped. The electrical charging contacts 40 are shown, by way of example, as contact points on the outer surface of the protrusion 37.

Figure 5D:
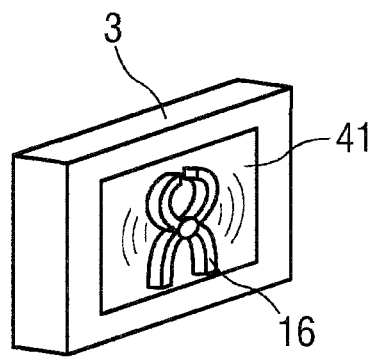

FIG. 5D shows the housing 3 with a support surface for contactless charging 41, onto which a wireless temperature sensor 16 or another wireless sensor can be placed or applied. Charging takes place in a contactless manner, e.g., via inductive power transmission.

Figure 6A:
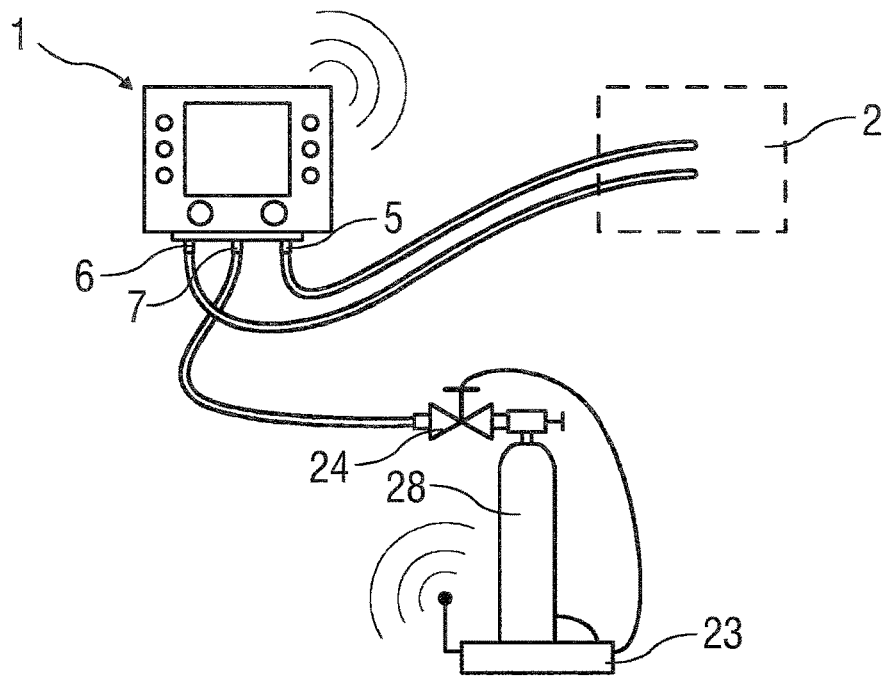

FIG. 6A shows another possible embodiment of the intelligent maintenance apparatus 1.

The high-pressure/HP port 5 and the low-pressure/LP port 6 of the maintenance apparatus 1 are connected to an air conditioner 2 via hose connections.

There is also a hose connection between the service port 7 of the maintenance apparatus 1 and the outlet of an electric switching valve 24, which is connected on the inlet side to a compressed gas cylinder 28.

The compressed gas cylinder 28 stands on a scale 23.

The scale 23 and the maintenance apparatus 1 are in radio communication with each other. The electric switching valve 24 is connected to the scale 23 by cable.

Figure 6B:
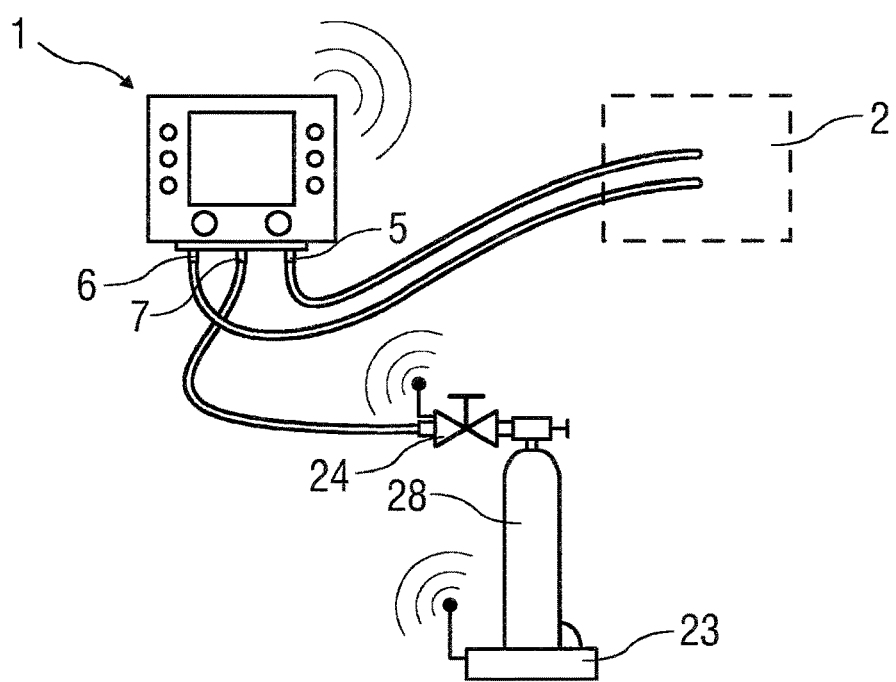

FIG. 6B shows another possible embodiment of the intelligent maintenance apparatus 1.

The high-pressure/HP port 5 and the low-pressure/LP port 6 of the maintenance apparatus 1 are connected to an air conditioner 2 via hose connections.

There is also a hose connection between the service port 7 of the maintenance apparatus 1 and the outlet of an electric switching valve 24, which is connected on the inlet side to a compressed gas cylinder 28.

The compressed gas cylinder 28 stands on a scale 23. The scale 23 and the maintenance apparatus 1 are in radio communication with each other. The electric switching valve 24 is also connected to the maintenance apparatus 1 and/or the scale 23 in radio communication.

Figure 7A:
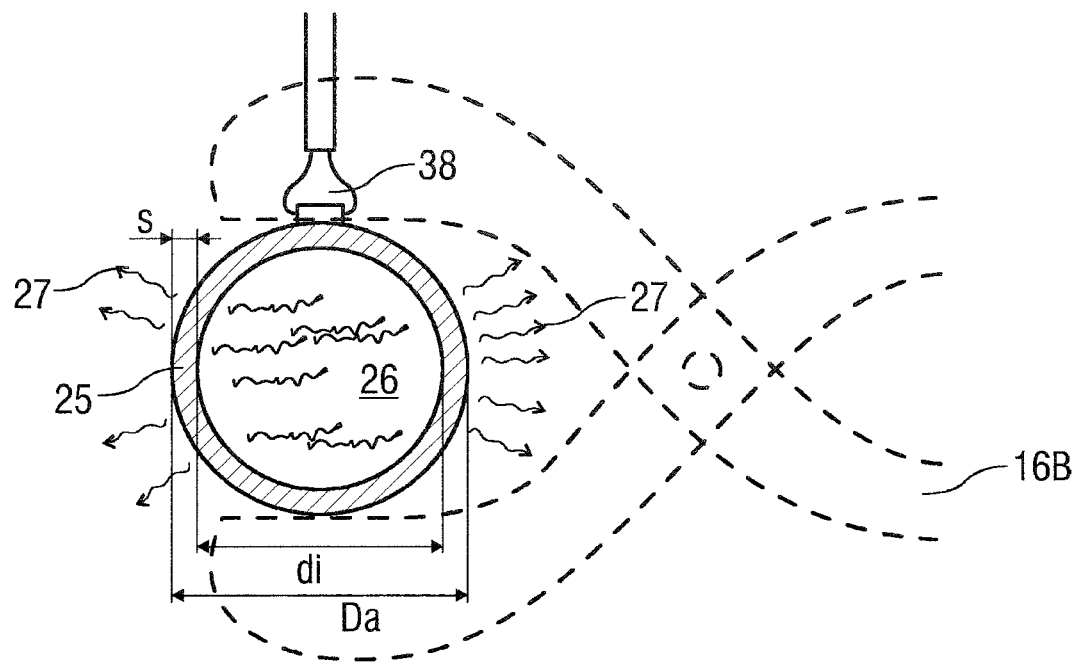

FIG. 7A shows a cross-sectional view of a pipeline 25 for a refrigerant 26.

A sensor head of a temperature sensor 38 is in thermal contact with an outer surface of the pipeline 25.

The pipeline 25 emits heat to its surroundings (=heat output 27), since the refrigerant 26 in the pipeline 25 in this representation has a temperature higher than an ambient temperature.

Geometry data of the pipeline 25 is qualitatively represented by an outer diameter Da, an inner diameter di, and a wall thickness s.

Figure 7B:
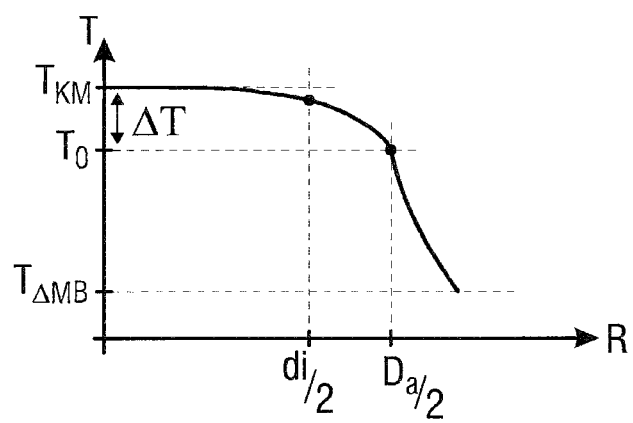

In FIG. 7B, a temperature curve is qualitatively applied over the radius from the center of the pipeline 25 of FIG. 7A.

While the temperature near the center is at least essentially constant, it drops slightly toward the inner edge of the pipeline 25 at di/2, as heat is dissipated to the surroundings via a pipe wall.

Within the pipe wall between di/2 and Da/2 there is a temperature gradient, the course of which depends on the temperature of the refrigerant 26, the ambient temperature of the surroundings and the heat conduction properties of the pipe material.

Figure 8A:
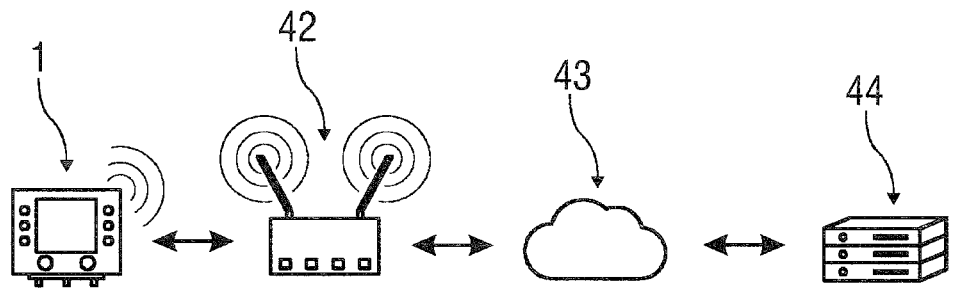

FIG. 8A schematically shows a possible embodiment of a communication arrangement in which a possible embodiment of the intelligent maintenance apparatus 1 is or will be connected to a server 44 via a WLAN router 42 and an internet-supported connection 43.

The maintenance apparatus 1 is in radio communication with the WLAN router 42. The WLAN router 42 is in turn connected to the server 44 by an internet-supported connection 43, for example, by a wired connection.

Figure 8B:
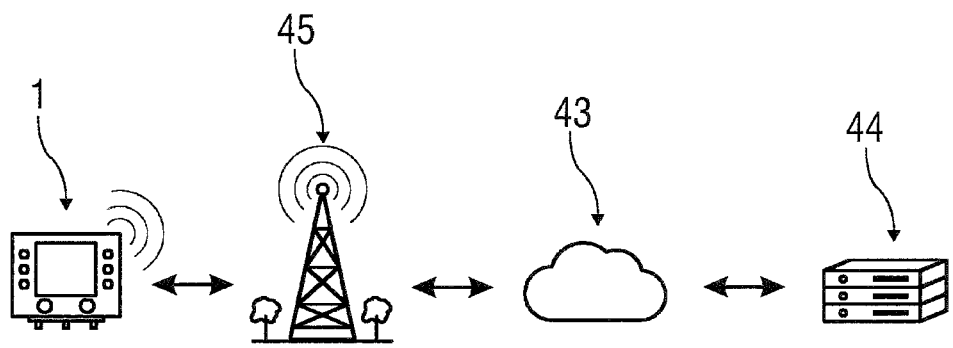

FIG. 8B schematically shows another possible embodiment of a communication arrangement, in which a possible embodiment of the intelligent maintenance apparatus 1 is or will be connected via a cellular connection to a cell tower 45 and via an internet-supported connection 43 to a server 44.

Figure 8C:
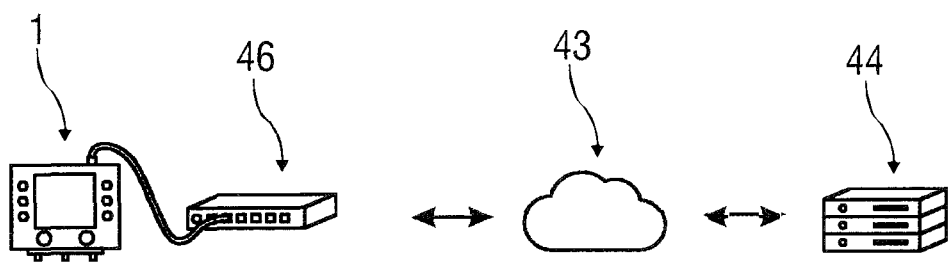

FIG. 8C schematically shows another possible embodiment of a communication arrangement, in which a possible embodiment of the intelligent maintenance apparatus 1 is or will be connected to a server 44 in a wired manner via a router 46 and an internet-supported connection 43.

FIG. 9A schematically shows another possible embodiment of a communication arrangement, in which a possible embodiment of the intelligent maintenance apparatus 1 is in radio communication with a portable computing device 21 as information carrier 15, and the portable computing device 21, 15 is or will be connected to a server 44 via a WLAN router 42 and an internet-supported connection 43.

FIG. 9B schematically shows a further possible embodiment of a communication arrangement, in which a possible embodiment of the intelligent maintenance apparatus 1 is in radio communication with a portable computing device 21 as information carrier 15, and the portable computing device 21, 15 is or will be connected to a server 44 via a cellular connection to a cell tower 45 and an internet-based connection 43.

Figure 9C:
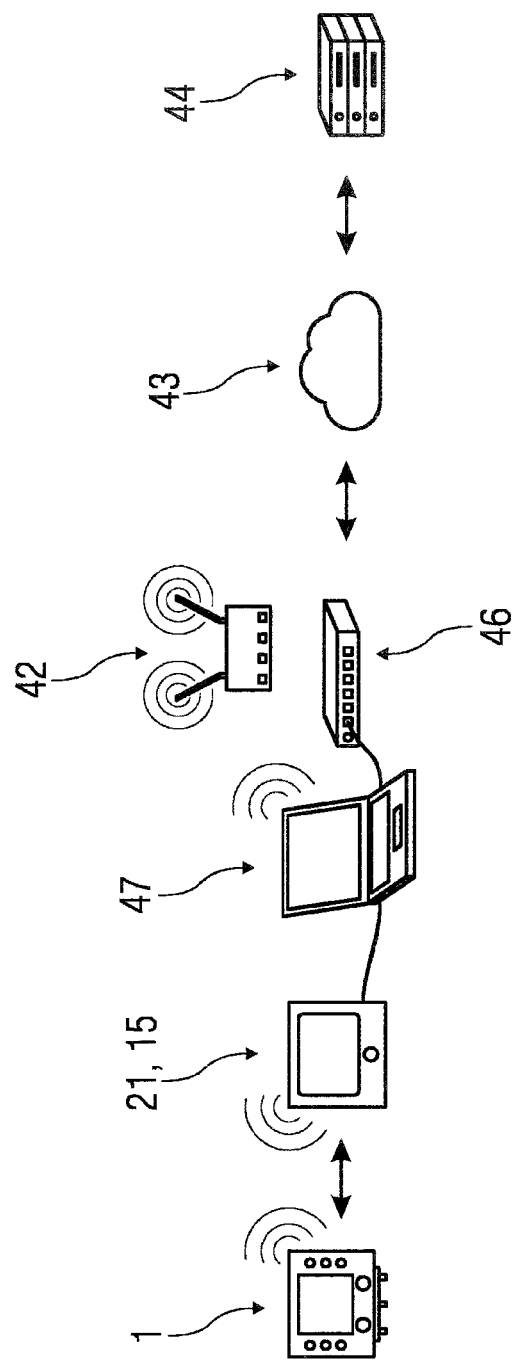

FIG. 9C schematically shows another possible embodiment of a communication arrangement, in which a possible configuration of the intelligent maintenance apparatus 1 is in radio communication with a portable computing device 21 as information carrier 15, and the portable computing device 21, 15 is or will be connected by cable to a further computing device 47.

Here, this further computing device 47 is or will be connected to a server 44 by means of a cable via a router 46 and an internet-supported connection 43. Alternatively, this further computing device 47 is wirelessly connected to a server 44 via a WLAN router 44 and an internet-supported connection 43.

Figure 10:
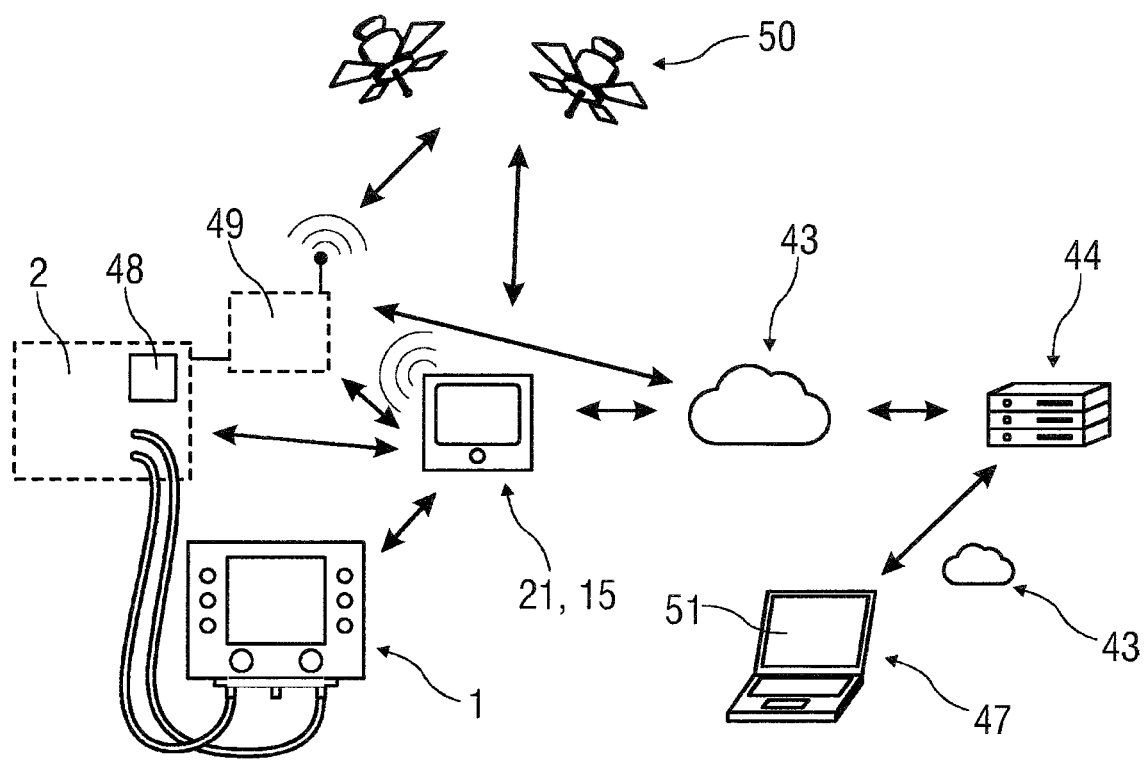

FIG. 10 shows a possible embodiment of the intelligent maintenance apparatus 1 and a portable computing device 21 as information carrier 15 at the center of a communication arrangement.

The maintenance apparatus 1 is in radio communication with the portable computing device 15, 21. The portable computing device 15, 21 is connected to a server 44 via an internet-supported connection 43.

The air conditioner 2 is provided with a machine-readable marking 48.

The information carrier 15 is configured to be able to identify the air conditioner 2 based on the machine-readable marking 48.

Furthermore, the air conditioning system 2 has an air conditioning control and/or communication unit 49, which is indicated schematically. The information carrier 15 can be in radio communication with this air conditioning control and/or communication unit 49.

Furthermore, a satellite-supported positioning system 50 is shown schematically. Both the air conditioning control and/or communication unit 49 and the information carrier 15 can be connected to this satellite-supported positioning system 50 and thereby determine their positions.

Other computing devices 47 can be connected to the server 44 via internet-supported connections 43. The server 44 provides information, such as system data and measurement logs 51, which can be retrieved and displayed by the computing devices 47.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A measuring apparatus comprising:
   a housing;
   at least one internal sensor;
   an electronic control unit;
   at least one radio module;
   an operating device; and
   an information carrier,
   wherein the measuring apparatus is configured to be in wired and/or wireless connection with external sensors,
   wherein the electronic control unit is configured to convert measurement signals of internal and external sensors into digital measurement data and to provide the digital measurement data for the information carrier,
   wherein the information carrier is configured, in the event of simultaneous availability of wired or wirelessly connected sensors, to provide as priority and display either the data of the wired or the data of the wirelessly connected sensors.

2. The measuring apparatus according to claim 1, wherein the information carrier is arranged to indicate available sensors, wherein in an event of a loss of a data connection to a wired sensor, the measuring apparatus is adapted to be automatically assigned a wirelessly connectable sensor.

3. The measuring apparatus according to claim 1, wherein the information carrier uses or displays measurement data from an external wired or wirelessly connected sensor as priority over measurement data from the internal sensor.

4. The measuring apparatus according to claim 1, further comprising a valve block comprising:
   a high-pressure port and an associated check valve for connection to a high-pressure portion of a system;
   a low-pressure port and an associated check valve for connection to a low-pressure portion of the system; and
   at least one service connection designed for connection to a compressed gas cylinder or a pump,
   wherein the high-pressure port and the low-pressure port are each in pressure-tight fluidic connection with a device-integrated pressure sensor, and
   wherein the system is an air-conditioning system.

5. The measuring apparatus according to claim 1, further comprising a pressure generating device and/or a pressure regulating device.

6. The measuring apparatus according to claim 1, wherein the information carrier is a measuring apparatus-integrated man-machine interface.

7. The measuring apparatus according to claim 1, wherein the information carrier is a portable computing device with a screen that is in wireless communication with the electronic control unit.

8. The measuring apparatus according to claim 7, wherein the portable computing device is directly connectable to the wirelessly connected and/or wired sensors.

9. The measuring apparatus according to claim 1, further comprising a data memory, wherein the electronic control unit is configured to temporarily store measurement data from the wired and/or wirelessly connected sensors as measurement data logs in the data memory and link them to other data records.

10. The measuring apparatus according to claim 1, wherein the information carrier assigns a low-pressure display function or a high-pressure display function or a negative pressure vacuum display function to an external sensor due to an identification signal transmitted by the external sensor and/or a measuring range transmitted by the external sensor and/or the measurement signals transmitted by the external sensor.

11. The measuring apparatus according to claim 1, further comprising a switching valve which is connected to the measuring apparatus in a wired or wireless manner, wherein an external sensor is configured to measure a weight, and wherein the switching valve is actuated by the measuring apparatus when a target value of the measured weight is reached.

12. The measuring apparatus according to claim 11, wherein the external sensor is a scale and is designed to measure a weight of a pressurized container for a refrigerant, the measuring apparatus receives weight data of the pressurized container, when the refrigerant is removed from the pressurized container and filled into an air-conditioning system or when the pressurized-container is filled with refrigerant that is withdrawn from the air-conditioning system, and when a threshold value of the weight of the pressurized container is reached, the switching valve closes a fluidic connection between the pressurized container and the air-conditioning system.

13. The measuring apparatus according to claim 12, wherein in the event of an interruption in the withdrawal of the refrigerant from the pressurized container or in the filling of the pressurized container with refrigerant, the electronic control unit is configured to store a withdrawn or filled refrigerant quantity and, upon continuation of the withdrawal or filling, to add a quantity of refrigerant, which was withdrawn from or filled into the pressurized container after the continuation, to the previously stored quantity of refrigerant.

14. A system for performing measurement tasks and for managing measurement data, the system comprising:
at least one measuring apparatus according to claim 1;
at least one cloud server with a cloud application; and
at least one user account in the cloud application,
wherein the measuring apparatus and/or the information carrier of the measuring apparatus is or are associated with the user account,
wherein the measuring apparatus provides measurement data logs which are associated with the user account, and
wherein the measuring apparatus and/or the information carrier of the measuring apparatus and/or the cloud application link further data records with the measurement data logs.

15. The system according to claim 14, further comprising a computing device, wherein the computing device or the information carrier of the measuring apparatus is associated with the user account, wherein the measuring apparatus and/or the information carrier of the measuring apparatus exchange measurement data logs and/or further data records with the computing device, wherein when there is no data connection to the cloud server or an existing data connection to the cloud server is interrupted during the exchange, and/or wherein certain storage and analysis functions are activated on the computing device and/or the information carrier of the measuring apparatus only after a link or initial login to a user account on the cloud server has taken place.

16. The system according to claim 14, wherein, during an initial connection or during a connection setup, an identification of the measuring apparatus is linked to an identification of the information carrier of the measuring apparatus or of a computing device and linked with a user account on the cloud server, and wherein for this purpose, as login ID, an IMEI number, a cell phone number and/or an email address are or will be linked to a user and a password.

17. The system according to claim 16, wherein the user account is assignable or associated with different systems or air conditioning systems, wherein an ID number of a system or air conditioning system is stored in the user account under which ID number a data record with measurement data of a system or air conditioning system is adapted to be stored or is stored.

18. The system according to claim 17, wherein a GPS position, an image, a movie or a customer reference is assignable or associated with the data record of a system or air conditioning system.

19. A method for starting up and/or maintaining an air-conditioning system comprising a measuring apparatus that includes a housing, at least one internal sensor, an electronic control unit, at least one radio module, an operating device and an information carrier, wherein the measuring apparatus is configured to be in wired and/or wireless connection with external sensors, the method comprising:
connecting a high-pressure portion of the air-conditioning system to a high-pressure port of the measuring apparatus;
connecting a low-pressure portion of the air-conditioning system to a low-pressure port of the measuring apparatus;
evacuating the air-conditioning system with a vacuum pump until a lowest pressure dependent on the capacity of the vacuum pump is reached or pressurizing the air-conditioning system with a pressure from a pressure source that is higher than the ambient air pressure;
switching off the vacuum pump for a certain period of time and recording a pressure increase due to leakage in the air-conditioning system via the internal sensors of the measuring apparatus or via wired and/or wirelessly connected pressure sensors connected to the measuring apparatus or disconnecting from the pressure source and recording a pressure drop due to leakage in the air-conditioning system via the internal sensors of the measuring apparatus or via the wired and/or wirelessly connected pressure sensors connected to the measuring apparatus for a certain period of time; and
extrapolating the measurement data recorded over the period of time, either to determine a time period after which a certain pressure limit value is reached and outputting this time period via the information carrier or to output a pressure limit value which is expected to be reached in a fixed time period due to leakage or calculating and outputting a leakage rate based on the measurement data recorded over the period of time,
wherein the electronic control unit converts measurement signals of the internal and external sensors into digital measurement data and provides the digital measurement data for the information carrier, and wherein the information carrier, in the event of simultaneous availability of the wired or wirelessly connected pressure sensors, provides as priority and displays either the data of the wired pressure sensors or the data of the wirelessly connected pressure sensors.

20. A method for starting up and/or maintaining an air-conditioning system comprising a measuring apparatus that includes a housing, at least one internal sensor, an electronic control unit, at least one radio module, an operating device and an information carrier, wherein the measuring apparatus is configured to be in wired and/or wireless connection with external sensors, the method comprising:

installing at least two or at least four temperature sensors that are wired and/or wirelessly connected to the measuring apparatus and at least one or at least two external pressure sensors that are wired and/or wirelessly connected to the measuring apparatus on the system; and connecting internal pressure sensors of the measuring apparatus to the system such that at least two of the following four temperature and pressure value pairs are measured:
temperature and pressure upstream of an expansion valve;
temperature and pressure downstream of the expansion valve;
temperature and pressure from an evaporator;
temperature and pressure downstream of the evaporator;
temperature and pressure upstream of a compressor; and/or
temperature and pressure downstream of the compressor;

assigning corresponding functions to the respective sensors; and receiving and processing the measurement data of all connected internal and external pressure sensors and the temperature sensors by the measuring apparatus and using refrigerant-specific auxiliary tables for calculating a real efficiency of the system according to the definition of the measures Energy Efficiency Ratio or Coefficient of Performance, wherein the electronic control unit converts measurement signals of the internal and external pressure sensors and the temperature sensors into digital measurement data and provides the digital measurement data for the information carrier, and wherein the information carrier, in the event of simultaneous availability of the wired or wirelessly connected external pressure sensors and the temperature sensors, provides as priority and displays either the data of the wired external pressure sensors and the wired temperature sensors or the data of the wirelessly connected external pressure sensors and the wirelessly connected temperature sensors.

* * * * *